(12) United States Patent
Bai et al.

(10) Patent No.: US 12,184,582 B2
(45) Date of Patent: Dec. 31, 2024

(54) MULTI-BEAM CSI FEEDBACK

(71) Applicant: QUALCOMM Incorporated, San Diego, CA (US)

(72) Inventors: Tianyang Bai, Mountain View, CA (US); Makesh Pravin John Wilson, San Diego, CA (US); Kiran Venugopal, Green Brook, NJ (US); Jung Ho Ryu, Fort Lee, NJ (US); Xiaoxia Zhang, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/477,322

(22) Filed: Sep. 28, 2023

(65) Prior Publication Data

US 2024/0031106 A1 Jan. 25, 2024

Related U.S. Application Data

(63) Continuation of application No. 17/457,013, filed on Nov. 30, 2021, now Pat. No. 11,870,728, which is a
(Continued)

(51) Int. Cl.
*H04W 24/08* (2009.01)
*H04L 5/00* (2006.01)
(Continued)

(52) U.S. Cl.
CPC ........... *H04L 5/0053* (2013.01); *H04W 24/08* (2013.01); *H04W 72/046* (2013.01); *H04W 72/21* (2023.01); *H04W 72/23* (2023.01)

(58) Field of Classification Search
CPC ... H04L 5/0053; H04L 5/0057; H04L 1/0026; H04W 24/08; H04W 72/046; H04W 72/21; H04W 72/23; H04B 7/0695; H04B 7/088
See application file for complete search history.

(56) References Cited

U.S. PATENT DOCUMENTS 9,391,736 B2 7/2016 Nayeb Nazar et al.
9,730,206 B2 8/2017 Fu et al.
(Continued)

FOREIGN PATENT DOCUMENTS

AU 2012204223 A1 8/2013
CN 102812658 A 12/2012
(Continued)

OTHER PUBLICATIONS

Huawei., et al., "Beam Failure Recovery", 3GPP TSG RAN WG1 Meeting #89, R1-1708135, 3rd Generation Partnership Project, Mobile Competence Centre, 650, Route Des Lucioles, F-06921 Sophia-Antipolis Cedex, France, vol. RAN WG1, No. Hangzhou, China, May 15, 2017-May 19, 2017, 10 Pages, May 6, 2017, XP051262270.
(Continued)

*Primary Examiner* — Jay P Patel
(74) *Attorney, Agent, or Firm* — Arent Fox, LLP

(57) ABSTRACT

In multi-beam communication, the UE may assist in the scheduling of beams utilized during the multi-beam communication by improving the manner in which the quality of the beam is reported to the network. The apparatus may measure a signal received from a base station on at least one beam. The apparatus may detect a triggering event for providing CSI for the at least one beam. The apparatus may transmit an uplink transmission comprising a CSI report in response to detecting the triggering event. The apparatus may receive an uplink request from a UE for providing CSI
(Continued)

for at least one beam. The apparatus may transmit an indication scheduling a CSI report in response to the uplink request. The apparatus may receive an uplink transmission from the UE comprising the CSI report for the at least one beam.

30 Claims, 18 Drawing Sheets

Related U.S. Application Data continuation of application No. 16/421,110, filed on May 23, 2019, now Pat. No. 11,196,524.

(60) Provisional application No. 62/700,170, filed on Jul. 18, 2018.

(51) Int. Cl.
*H04W 72/044* (2023.01)
*H04W 72/21* (2023.01)
*H04W 72/23* (2023.01)

(56) References Cited

U.S. PATENT DOCUMENTS

| | | |
|---|---|---|
| 10,123,343 B2 | 11/2018 | Nazar et al. |
| 10,270,514 B2 | 4/2019 | Moon et al. |
| 10,841,914 B2 | 11/2020 | Liou et al. |
| 10,893,431 B2 | 1/2021 | Liou et al. |
| 10,904,895 B2 | 1/2021 | Nayeb Nazar et al. |
| 11,063,648 B2 | 7/2021 | Xiao et al. |
| 11,134,492 B2 | 9/2021 | Guo et al. |
| 11,196,524 B2 | 12/2021 | Bai et al. |
| 11,375,393 B2 | 6/2022 | Liou et al. |
| 11,382,136 B2 | 7/2022 | Deng et al. |
| 11,552,686 B2 | 1/2023 | Yang |
| 2012/0250549 A1 | 10/2012 | Lee et al. |
| 2015/0117394 A1 | 4/2015 | Wang et al. |
| 2016/0270112 A1 | 9/2016 | Dinan |
| 2017/0013565 A1 | 1/2017 | Pelletier et al. |
| 2017/0207845 A1 | 7/2017 | Moon et al. |
| 2018/0006791 A1 | 1/2018 | Marinier et al. |
| 2018/0048375 A1 | 2/2018 | Guo et al. |
| 2018/0092156 A1 | 3/2018 | Kim et al. |
| 2018/0103407 A1 | 4/2018 | Nagaraja et al. |
| 2018/0124625 A1 | 5/2018 | Luo et al. |
| 2018/0192432 A1 | 7/2018 | Tenny et al. |
| 2018/0192438 A1 | 7/2018 | John Wilson et al. |
| 2018/0212800 A1 | 7/2018 | Park et al. |
| 2018/0227031 A1 | 8/2018 | Guo et al. |
| 2018/0269939 A1 | 9/2018 | Hu et al. |
| 2018/0302889 A1 | 10/2018 | Guo et al. |
| 2018/0368142 A1 | 12/2018 | Liou |
| 2018/0376428 A1* | 12/2018 | Lin ................. H04W 16/28 |
| 2019/0097874 A1* | 3/2019 | Zhou ................. H04W 76/27 |
| 2019/0104549 A1 | 4/2019 | Deng et al. |
| 2019/0141557 A1 | 5/2019 | Da Silva et al. |
| 2019/0141693 A1 | 5/2019 | Guo et al. |
| 2019/0150013 A1 | 5/2019 | Zhang et al. |
| 2019/0150133 A1 | 5/2019 | Li et al. |
| 2019/0215136 A1 | 7/2019 | Zhou et al. |
| 2019/0223033 A1 | 7/2019 | Nam et al. |
| 2019/0230545 A1 | 7/2019 | Liou et al. |
| 2019/0253128 A1 | 8/2019 | Moon et al. |
| 2019/0253964 A1 | 8/2019 | Li et al. |
| 2019/0261338 A1 | 8/2019 | Akkarakaran et al. |
| 2019/0297648 A1 | 9/2019 | Nagaraja et al. |
| 2019/0306909 A1 | 10/2019 | Zhou et al. |
| 2019/0306924 A1 | 10/2019 | Zhang et al. |
| 2019/0312698 A1 | 10/2019 | Akkarakaran et al. |
| 2019/0320469 A1 | 10/2019 | Huang et al. |
| 2019/0334603 A1 | 10/2019 | Venugopal et al. |
| 2019/0356420 A1 | 11/2019 | John Wilson et al. |
| 2019/0356438 A1 | 11/2019 | Lee et al. |
| 2020/0014453 A1 | 1/2020 | Takeda et al. |
| 2020/0053800 A1 | 2/2020 | Deng et al. |
| 2020/0092685 A1 | 3/2020 | Fehrenbach et al. |
| 2020/0169364 A1 | 5/2020 | Hao et al. |
| 2020/0178241 A1 | 6/2020 | Wu et al. |
| 2020/0244329 A1 | 7/2020 | Xiao et al. |
| 2020/0288452 A1 | 9/2020 | Simonsson et al. |
| 2020/0344808 A1 | 10/2020 | Ku et al. |
| 2020/0374960 A1 | 11/2020 | Deenoo et al. |
| 2020/0404559 A1 | 12/2020 | Koskela et al. |
| 2020/0404690 A1 | 12/2020 | Lee et al. |
| 2021/0021320 A1 | 1/2021 | Koskela et al. |
| 2021/0075490 A1 | 3/2021 | Yang |
| 2021/0344398 A1 | 11/2021 | Xiao et al. |
| 2021/0392634 A1 | 12/2021 | Guo et al. |
| 2022/0085952 A1 | 3/2022 | Bai et al. |

FOREIGN PATENT DOCUMENTS

| | | |
|---|---|---|
| CN | 110291818 B | 6/2022 |
| EP | 3462633 A1 | 4/2019 |
| EP | 3754864 A1 | 12/2020 |
| WO | 2012087066 A2 | 6/2012 |
| WO | 2012094608 A2 | 7/2012 |
| WO | 2016086144 A1 | 6/2016 |
| WO | 2017014572 A1 | 1/2017 |
| WO | 2017116209 A1 | 7/2017 |
| WO | 2017136706 A1 | 8/2017 |
| WO | 2017204551 A1 | 11/2017 |
| WO | 2018169357 A1 | 9/2018 |
| WO | 2018182283 A1 | 10/2018 |
| WO | 2018230862 A1 | 12/2018 |

OTHER PUBLICATIONS

International Preliminary Report on Patentability—PCT/US2019/039974, The International Bureau of WIPO—Geneva, Switzerland, Jan. 28, 2021.
International Search Report and Written Opinion—PCT/US2019/039974—ISA/EPO—Oct. 17, 2019.
Mediatek., et al., "WF on Beam Failure Recovery", R1-1706633, 3GPP TSG RAN WG1 Meeting #88b, Spokane, USA, Apr. 3-7, 2017, 6 Pages.
Nokia., et al., "Beam Recovery", 3GPP Draft, R1-1708905, 3GPP TSG RAN WG1#89, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017 May 6, 2017, XP051262756, Retrieved from the Internet: URL: http://www.3gpp.org/ftp/tsg_ran/WG1_RL1/TSGR1_89/Docs/ [retrieved on May 6, 2017], 7 pages.
Samsung: "Discussion on Beam Measurement for 5G New Radio Interface in mmWave Frequency Bands", 3GPP TSG RAN WG2 #94, 3GPP Draft; R2-163652, 3rd Generation Partnership Project (3GPP), Mobile Competence Centre; 650, Route Des Lucioles; F-06921 Sophia-Antipolis Cedex; France, vol. RAN WG2, No. Nanjing, China; May 23, 2016-May 27, 2016, May 22, 2016 (May 22, 2016), XP051105081, pp. 1-4, Chapter 2,Sections2, 3,General Aspects of Beam Measurements.

* cited by examiner

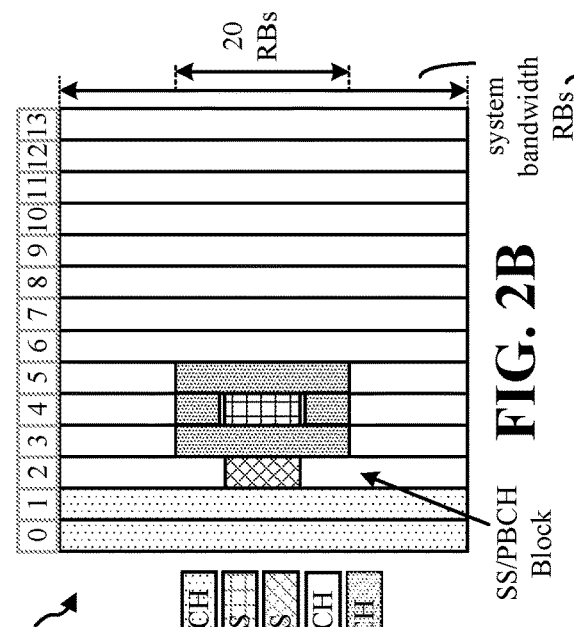
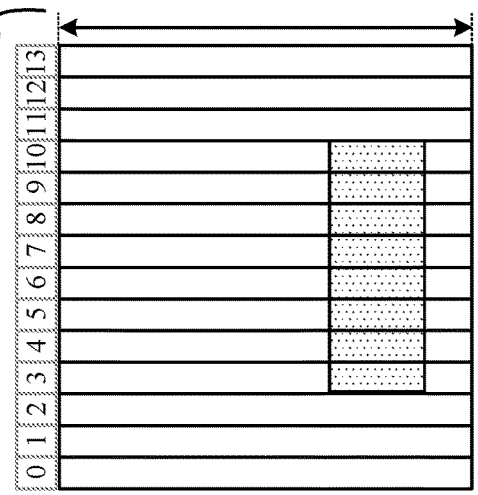
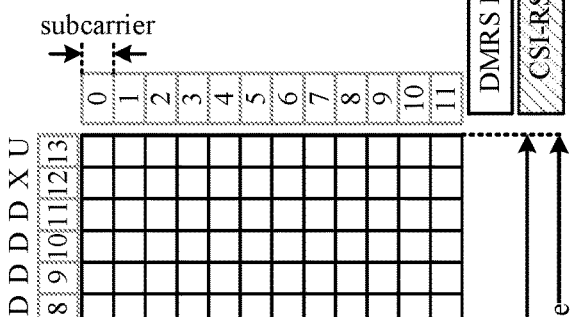
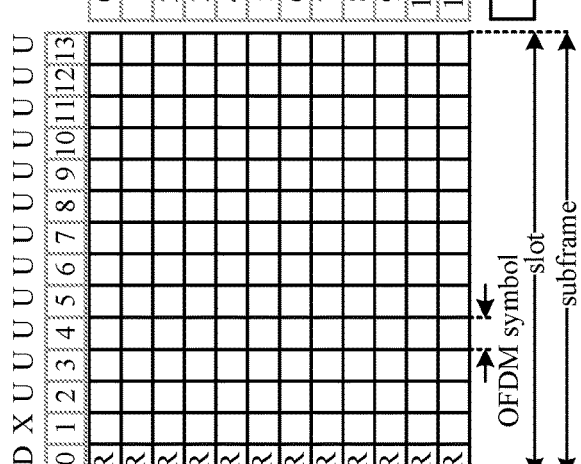
FIG. 2A
FIG. 2B
FIG. 2C
FIG. 2D

MULTI-BEAM CSI FEEDBACK

CROSS REFERENCE TO RELATED APPLICATION(S)

This application is a continuation of U.S. patent application Ser. No. 17/457,013, entitled "MULTI-BEAM CSI FEEDBACK," filed on Nov. 30, 2021, and claiming the benefit of U.S. patent application Ser. No. 16/421,110, entitled "MULTI-BEAM CSI FEEDBACK," filed on May 23, 2019, and U.S. Provisional Application Ser. No. 62/700,170, entitled "MULTI-BEAM SCHEDULING REQUEST FOR FAST CSI FEEDBACK," filed on Jul. 18, 2018, all of which are expressly incorporated by reference herein in their entirety.

BACKGROUND

Technical Field

The present disclosure relates generally to communication systems, and more particularly, to a millimeter wave (mmW) communication system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a User Equipment (UE). The apparatus measures a signal received from a base station on at least one beam. The apparatus then detects a triggering event for providing Channel State Information (CSI) for the at least one beam. The apparatus then transmits an uplink transmission comprising a CSI report in response to detecting the triggering event.

In another aspect of the disclosure, a method, a computer-readable medium, and an apparatus are provided for wireless communication at a base station. The apparatus receives an uplink request from a UE for providing CSI feedback for at least one beam. In response, the apparatus transmits an indication scheduling a CSI report from the UE. Then, the apparatus receives an uplink transmission from the UE comprising a CSI report for the at least one beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
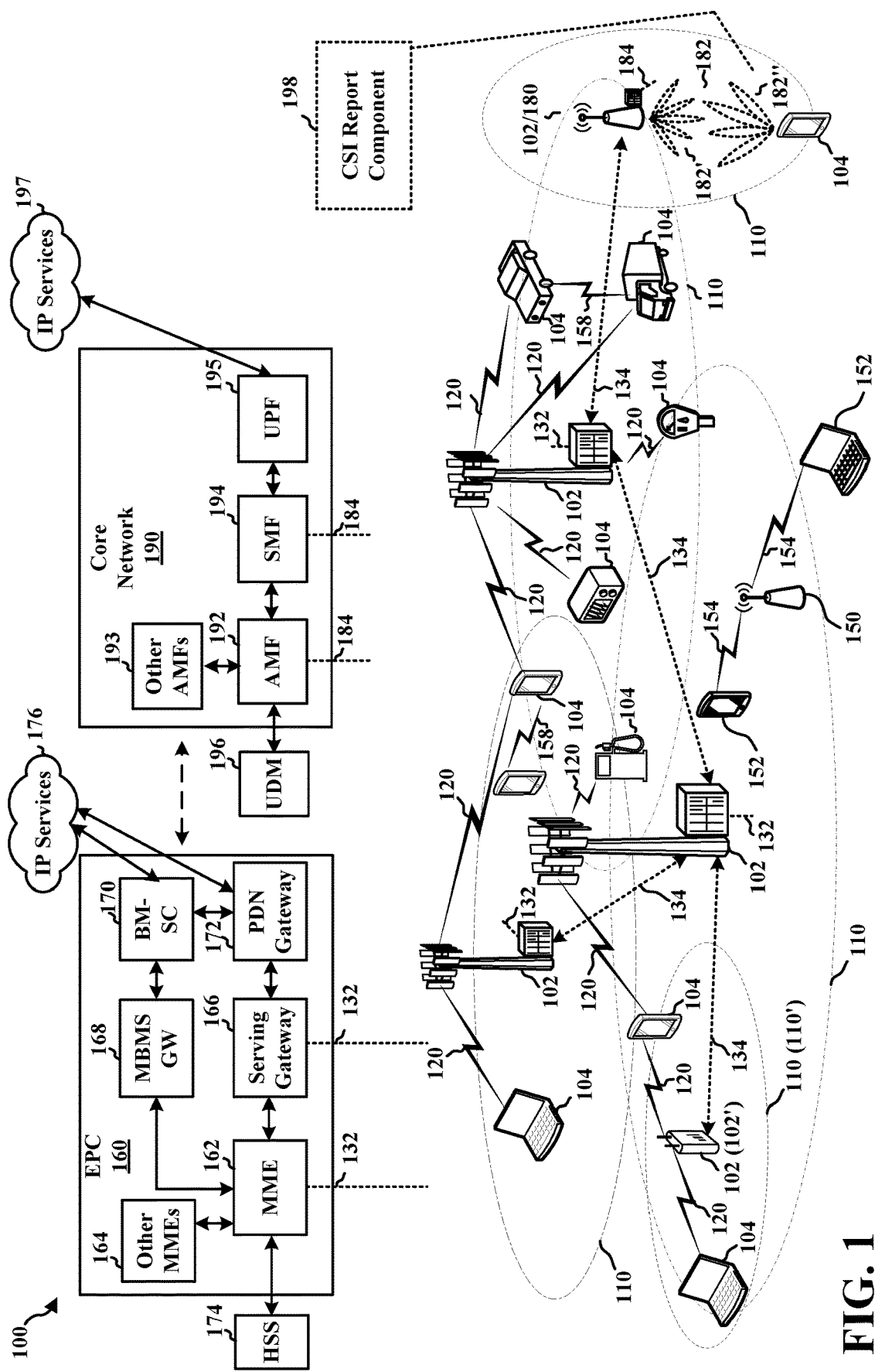
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a device (e.g., the UE 104) may comprise a CSI report component 198 configured to determine an occurrence of a triggering event and transmit an uplink transmission to a base station including information related to the triggering event and to transmit a channel state information (CSI) report, to the base station, upon the occurrence of a triggering event detected by the UE 104. In another configuration, the UE 104 may transmit an uplink request to the base station (e.g., gNB) in response to the occurrence of a triggering event detected by the UE 104. The UE 104 may receive an indication from the base station in response to the uplink request, e.g., the indication may include control information for transmission of a CSI report by the UE. The UE transmits the scheduled uplink transmission comprising CSI information, which may include information related to the triggering event.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies p 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{\mu}*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
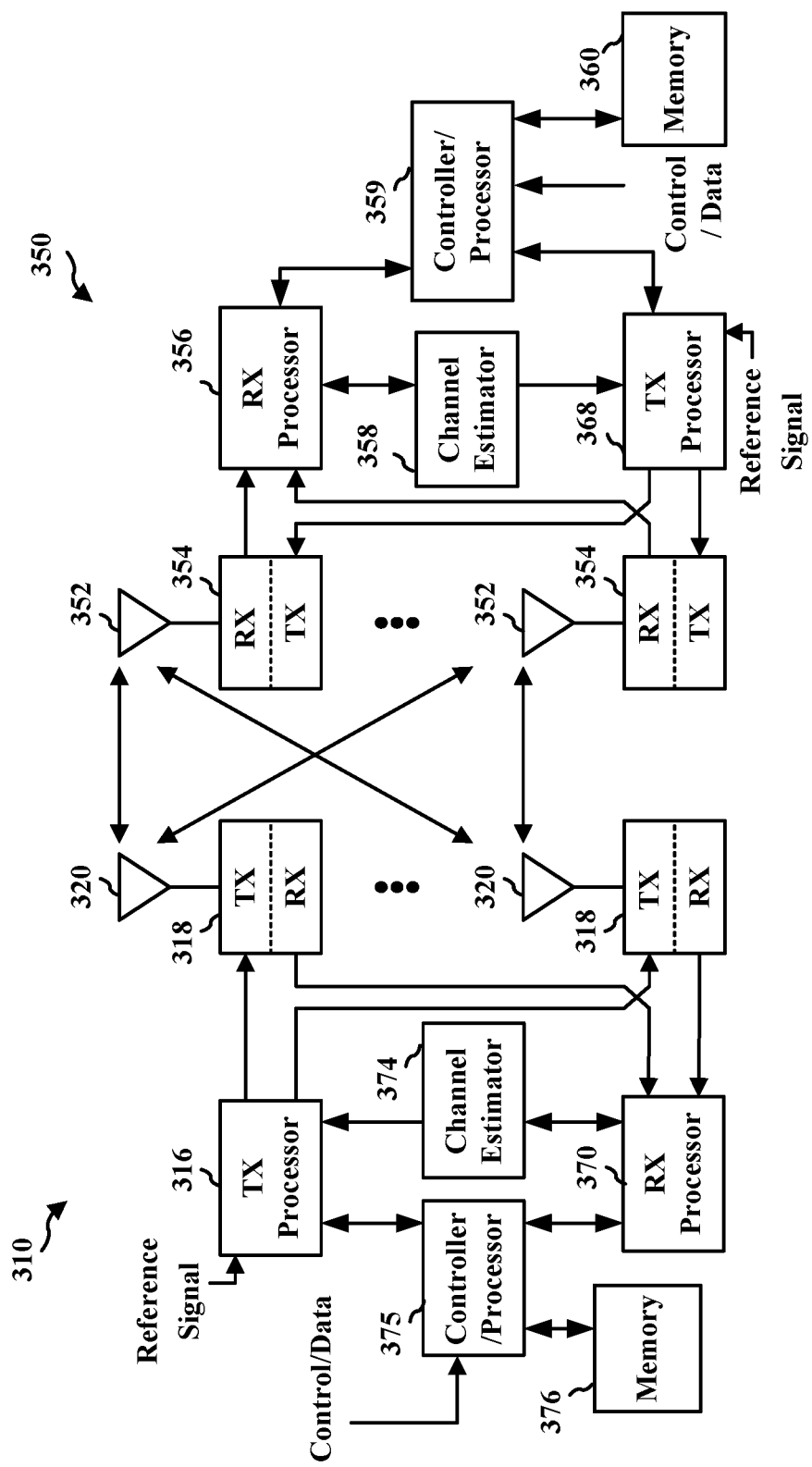
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
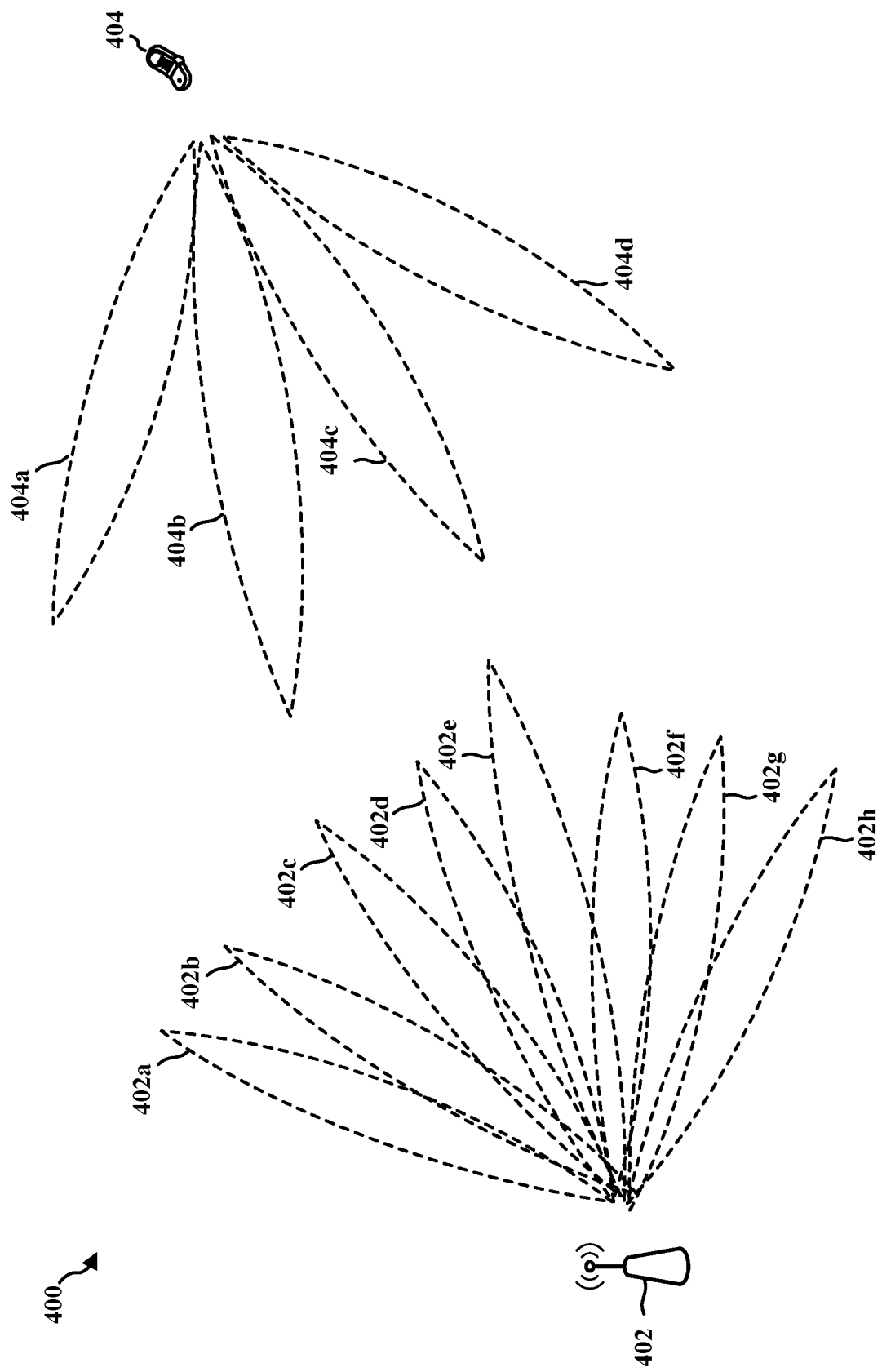
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5B:
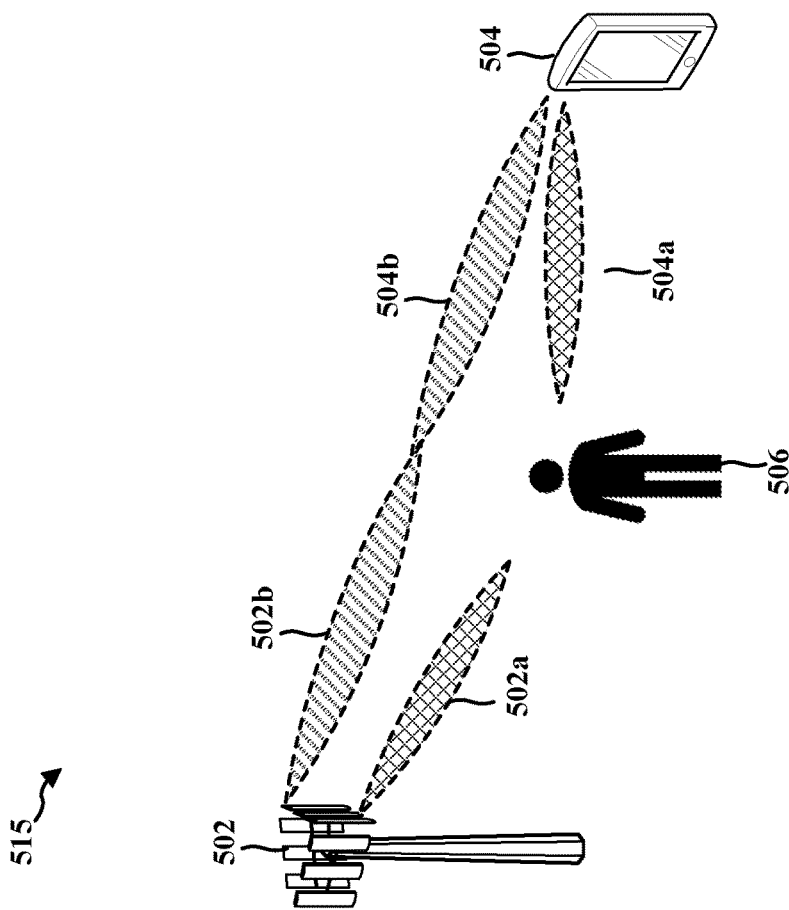
FIG. 5B illustrates a wireless communication system in accordance with certain aspects of the disclosure.
Figure 5A:
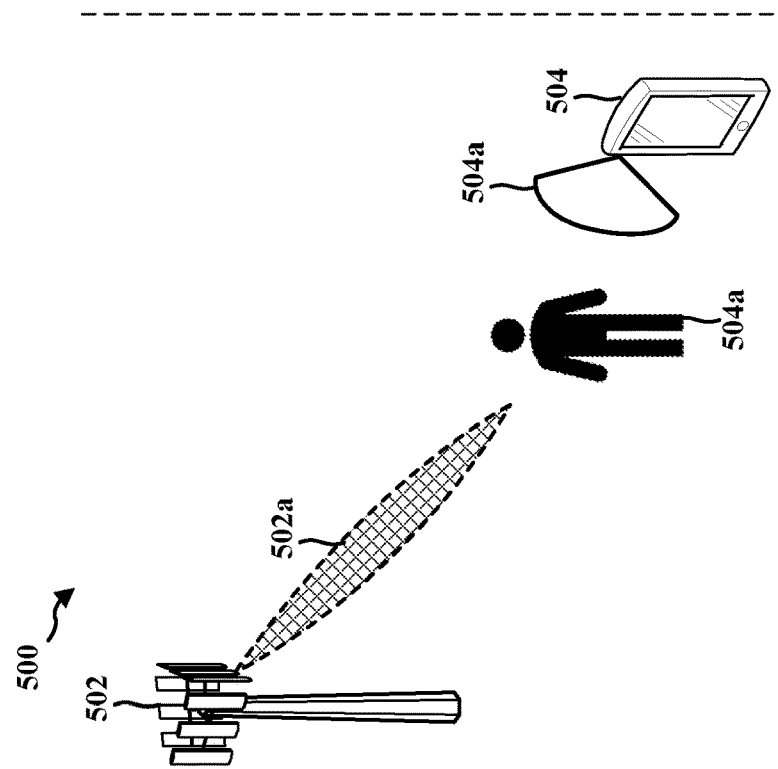
FIG. 5A illustrates a wireless communication system in accordance with certain aspects of the disclosure.

FIG. 5A illustrates a wireless communication system 500 in accordance with certain aspects of the present disclosure. The wireless communication system 500 can include a base station 502 and a UE 504. The base station can correspond to, e.g., base station 102, 180, 310, 402, 804, apparatus 1102/1102'. The UE may correspond to, e.g., UE 104, 350, 404, 802, apparatus 1402/1402'.

In wireless communications, e.g., mmW wireless communication, base stations and UEs can transmit and/or receive a plurality of directional beams in order to facilitate communication between each other. Wireless communication systems can rely on directional beamforming to improve on a number of transmission characteristics, such as signal-to-noise ratio (SNR). Such directional beams may be sensitive to blocking. If an object blocks one or more beams, then the benefits of beamforming may be reduced or negated. In order to minimize the effects of blocking, wireless communication systems can transmit on multiple beams.

At times, the beams used for communication from the base station and the UE may become blocked. For example, a moving person or vehicle may be temporarily positioned in the path of the beam, limiting the energy received by the UE or base station over the beam. An item blocking a beam path may be static or dynamic. For example, a building, a pillar, or other static structures may block a beam between a base station and a UE, e.g., as the UE moves relative to the stationary structure. In mmW communication, the static structure may block the signal over the beam from a base station until the UE moves to a new position. Beam blockage may also include dynamic blockage due to moving items, such as vehicles, people, etc. that temporarily move into positions between the UE, the base station and/or the cluster(s) which assist in communications. For example, when a user 506 moves from point A to point B, an object that did not obstruct the beamformed direction (e.g., direction 502a and direction 504a) at point A may obstruct the beamformed direction between at point B. Further, when the user's 506 fingers block one or more of the subarrays located at the UE 504, the beamformed direction between the base station 502 and the UE 504 may also be obstructed. In addition, when the user 506 rotates the UE 504, the polarization between base station 502 and the UE 504 may be mismatched. When the beamformed direction between the base station 502 and the UE 504 is obstructed or when the polarization is mismatched, the SNR of signal transmissions may be reduced, which lowers the QoS experienced by the user 506.

Blocked communication paths between a UE and base station may be a more serious issue for mmW communication than for other types of communication, e.g., sub-6 carrier frequency communication. The penetration loss through certain materials, such as the human body, can be much higher in mmW bands than sub-6 frequency bands. In mmW communication, a channel has a clustered structure, e.g., the channel is a superposition of a number of clusters over which communication is possible. The blockage may occur at the base station side or at the UE side. At the UE side, a body part, e.g., hand, shoulder, face, etc., or another person may block an antenna subarray.

FIG. 5B illustrates a wireless communication system 515 in which multi-beam communication may be employed to address the potential for blocked beams described in connection with FIG. 5A. In multi-beam communication, the base station may transmit downlink communication to the UE on multiple beams. Similarly, the UE may transmit uplink communication to the base station on multiple beams. As seen in FIG. 5B, the first beamformed direction 502a, 504a can be blocked by the user 506, and hence, transmissions in the first beamformed direction 502a, 504a may have a reduced SNR as compared to when the first beamformed direction 502a, 504a is unblocked. However, the second beamformed direction 502b, 504b may be unblocked, and hence, may provide an increased SNR as compared to the first beamformed direction 502a, 504a. Accordingly, FIG. 5B illustrates that multi-beam transmission aids the wireless communication when at least one beam is blocked, especially since beam blocking may contribute to a reduction in SNR. Indeed, transmitting on multiple beams can provide transmission robustness to reduce the effects of beam blocking, thereby improving the overall transmit diversity or macro-diversity.

During a multiple beam transmitting procedure, the UE may be configured to feedback a beam index and corresponding beam quality information to the base station. The beam quality information may include any of a Reference Signal Received Power (RSRP), a CQI, a PMI, and/or a RI for the respective beams. The UE may also be configured to use certain signals and/or channels to monitor a DL channel state information, and transmit the CSI feedback for the DL channel to the base station. For example, the UE can be configured to measure L1-RSRP and report the values to the base station such that the base station can monitor the channel state of the beam(s) for communication with the UE. The base station uses the DL CSI feedback to determine the status of the beams that it is using to communicate with the UE. For example, the base station can determine that a reduced SNR and/or a reduced RSRP in one link/beam could be indicative of a beam that is blocked. In such examples, the base station can provide instructions to the UE to update the beam.

The base station may receive such feedback information in a periodic manner, e.g., every 200 ms. At the base station, each beam index can be mapped to a specific collection of angles or directions. The base station may accumulate the feedback information from multiple UEs that it serves. The base station may evaluate the evolution of the feedback information over time in order to make an inference regarding potentially blocked angle(s)/direction(s).

Figure 6:
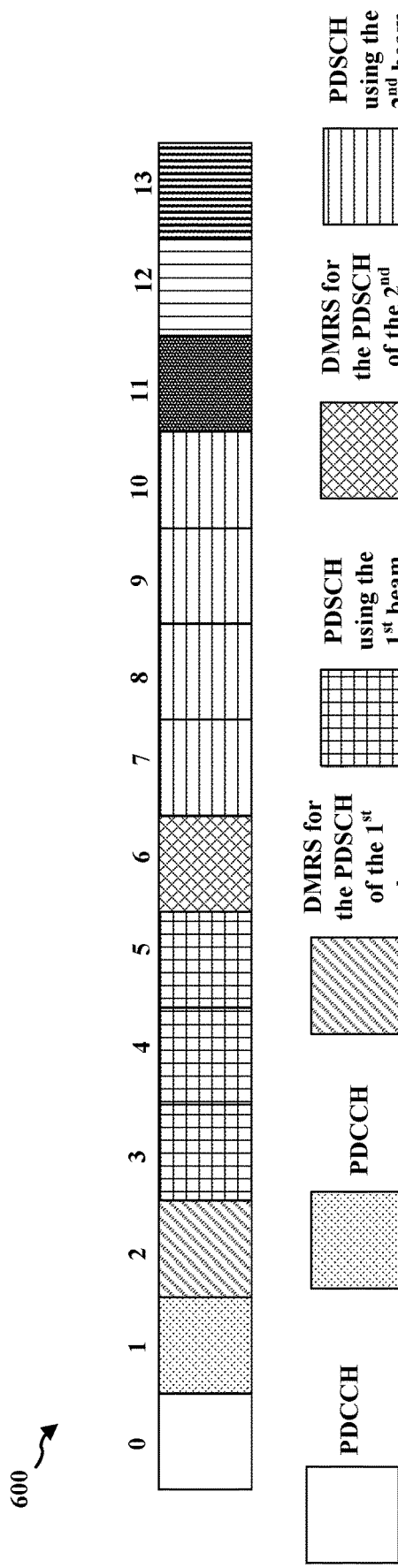
FIG. 6 illustrates a slot in accordance with certain aspects of the disclosure.

FIG. 6 illustrates an example communication structure 600 for multi-beam transmissions between a UE and a base station. In the example of FIG. 6, two transmission configuration indicator (TCI) beams, Beam 1 and Beam 2, may be used by the base station to communicate with the UE. Thus, the UE may monitor both Beam 1 and Beam 2 and the respective CSI feedback from the UE may be reported to the base station via the respective PUCCH, e.g., in a PUCCH for Beam 1 and a PUCCH for Beam 2. The slot shown in FIG. 6 has 14 symbols. This example shows a symbol of PDCCH for Beam 1, a symbol of PDCCH for Beam 2, a symbol of DMRS for the PDSCH of Beam 1, symbols of PDSCH for Beam 1, a symbol of DMRS for the PDSCH of Beam 2, symbols of PDSCH for Beam 2, a gap symbol, a symbol of PUCCH for Beam 1, and a symbol of PUCCH for Beam 2. The UE can be configured to measure the L1-RSRP and/or CQI based on certain channels/signals. For example, the UE may take such measurements within a synchronization signal (SS)/CSI-RS, or PDCCH/PDSCH/DMRS of a previous slot or within the same slot. Thus, the UE may measure the symbol of PDCCH for Beam 1 and the PDCCH for Beam 2, the DMRS for Beam 1 and the DMRS for Beam 2, and/or the PDSCH for Beam 1 and the PDSCH for Beam 2. The UE may then report the measured feedback to the base station in the respective PUCCH of each beam. Alternatively or additionally, the UE could send the feedback on the PUCCH of a single beam.

Figure 7:
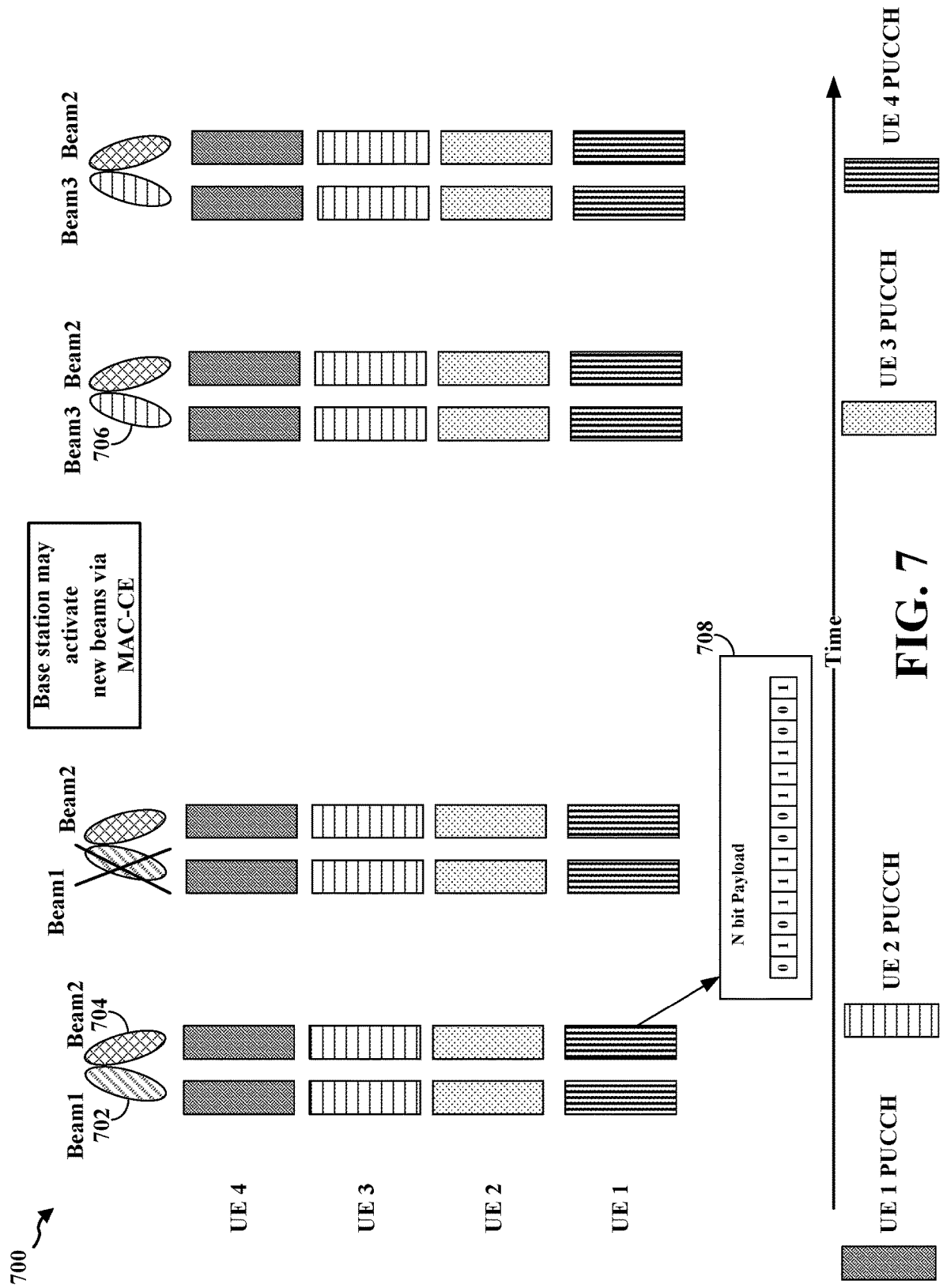
FIG. 7 illustrates an example of multi-beam transmission in accordance with certain aspects of the disclosure.

FIG. 7 illustrates an example 700 of feedback information transmissions between a plurality of UEs and a base station. The base station may transmit a beamformed signal to multiple UEs (UE 1-UE 4) using a plurality of directional beams. In the example of FIG. 7, the base station is transmitting a directional Beam 1 702 and a directional Beam 2 704 for at least one of the UEs (UE 1-UE 4). Each of the UEs can be configured to transmit a PUCCH to the base station on each of the beams 702, 704. It should be understood that each UE may use the same beam or different beam (or Tx/Rx beam pair) to communicate with the base station. The periodic CSI feedback report for each beam can be transmitted in a periodic manner by the respective UEs to the base station on the PUCCH for the respective beam. With reference to UE 1, the PUCCH transmitted by UE 1 to the base station via Beam 2 704 can require a reservation of PUCCH resources in order to transmit the CSI feedback report. In the example of FIG. 7, an N bit payload 708 can be utilized to reserve the PUCCH resources for the CSI feedback report. The N bit payload 708 can include a plurality of bits. While in the example of FIG. 7, the N bit payload 708 has 14 bits, this is merely an example number of bits to illustrate the concept. In the example of FIG. 7, each of the PUCCHs transmitted by the UEs would require a reservation of PUCCH resources in order to periodically send the CSI feedback report. The PUCCH transmissions can provide an accurate reporting of the beams, such that the base station can readily determine if a beam has failed for a particular UE. For example, in FIG. 7, the UEs transmit the CSI feedback report via the PUCCH, and the base station can determine that Beam 1 702 and Beam 2 704 are not blocked or have sufficient signal strength and continues to keep them active. However, in the event that a beam was to fail, such as Beam 1 702, the base station would monitor the status of Beam 1 through the CSI feedback report and would determine that Beam 1 702 has failed. At which point the base station would be able to activate a new beam Beam 3 706 and would take over for the failed beam Beam 1. In some configurations, the base station may activate the new beam(s) via medium access control-control element (MAC-CE). MAC-CEs can be used for MAC layer control signaling between the base station and the UE. However, in some configurations, the base station may activate the new beam (s) using other methods and aspects are not intended to be limited to using MAC-CEs.

While continual monitoring the channel by each of the UEs and the periodic CSI feedback reports would provide an accurate reporting of the beams, such reports may lead to an overhead burden. As well, the repeated transmission of CSI feedback by the UE can more quickly drain the battery of the UE. The UE may expend considerable battery power to continually provide uplink transmissions of the CSI feedback reports, which could reduce the UE's battery life. Aspects presented herein improve the efficient use of wireless resources and provide a power saving feature that improves the efficient use of battery power at a UE. In order to track multiple beams, UE 1-UE 4 in FIG. 7 may reserve PUCCH resources in the frequency band in order to send the CSI report. The reserved PUCCH resources can be large and can result in a significant overhead requirement. For example, in the example slot in FIG. 6, the slot is made up of 14 symbols, where 2 out of 14 symbols are reserved explicitly for PUCCH to transmit the CSI feedback report. The reservation of symbols for PUCCH transmissions for periodic CSI feedback can reduce the amount of available resulting in inefficient use of limited and valuable frequency resources.

Figure 8:
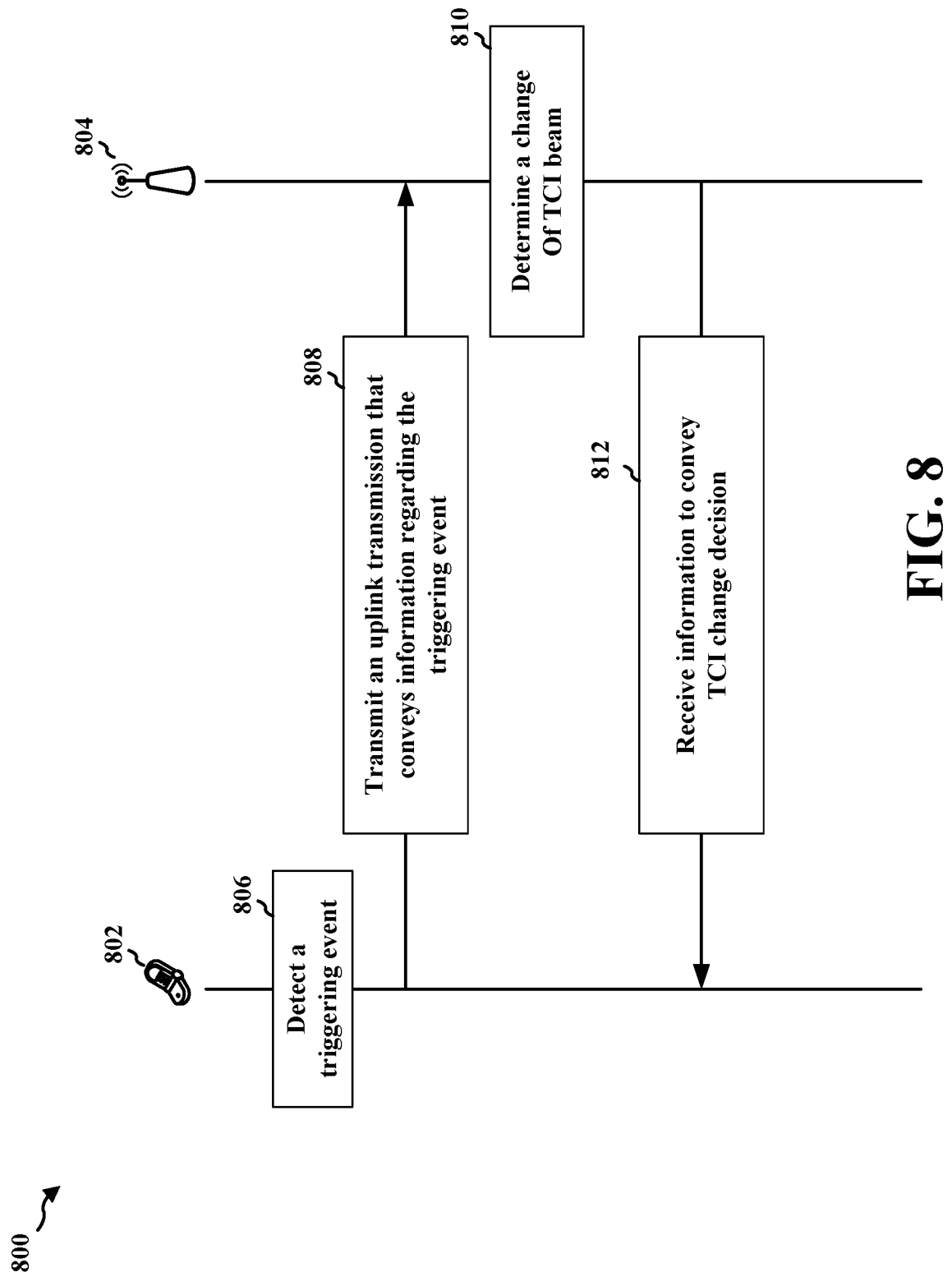
FIG. 8 illustrates an example communication flow between a base station and a UE.

FIG. 8 illustrates an example of communication 800 between a base station 804 and a UE 802 that may be configured to transmit feedback information (e.g., a CSI feedback report) in a manner that reduces power consumption and improves the efficient use of wireless resources. Base station 804 may correspond to base station 102, 180, 310, 402, 502, 1004, 1350. The UE 802 may correspond to UE 104, 350, 404, 504, 1002, apparatus 1302/1302'. The communication between base station 804 and UE 802 may comprise mmW communication. At 806, the UE 802 can be configured to detect the occurrence of a triggering event. The UE may make measurements based on signals and/or channels received from the base station (e.g., any of CSI-RS, SS, PDSCH, PDCCH, DMRS), as described in connection with FIG. 6. The triggering event can be based on any of various different types of measurements from certain signals/channels. An example triggering event can occur when the UE detects that a certain measurement for one of the signals/channels has fallen below a given threshold (e.g., L1-RSRP and/or CQI is below a threshold value). Another example triggering event can be based on the measurement differences between multiple beams. For example, if the strength of a serving beam falls below the strength of non-serving beam(s), a triggering event for a CSI report may be determined to have occurred. In some examples, the UE may be configured to detect or identify a change of the configuration in the UE RF modules. In such examples, the change of the configuration of the UE RF modules may include a UE configured as a flip phone or a phone having a flexible display, such that the shape and/or configuration of the UE may be modified, which may result in certain antenna modules becoming unusable and/or becoming usable with the UE in the modified shape and/or configuration. The UE may be configured to detect when the UE is in the modified shape and/or configuration, and report such change to the base station. In some examples, the UE may be configured to predict a future channel metric, e.g., RSRP. In such instances, when the UE detects that a future RSRP is worse than a certain threshold, the UE may report the detection using SR. In such instance, the future RSRP is predicted instead of being measured. As another example, the triggering event may be determined to have occurred when the UE detects or identifies a change of the configuration in the UE RF module(s). For example, a UE may be configured as a flip phone or a foldable phone with a flexible display. In such examples, the UE may be configured to detect that the shape and/or configuration of the phone has been altered (e.g., opening or closing the flip phone or foldable phone), such that the antenna module may not be useable or becomes usable due to shape and/or configuration of the phone being altered. The UE, upon detecting that the antenna module may not be useable or becomes useable, may be a triggering event for a CSI report, such that the change of the configuration of the UE RF module is reported to the base station. As another example, the triggering event can occur when the UE predicts that a certain metric for one of the signals/channels has fallen below a given threshold (e.g., a future RSRP is below a threshold value). For example, if the UE predicts that a future channel metric (e.g., RSRP) is less than a threshold value, a triggering event for a CSI report may be determined to have occurred. As such, when the UE predicts or otherwise estimates that an RSRP will be below a threshold, the UE may report the change in the future channel metric (e.g., RSRP) in a scheduling request (SR).

Once the UE detects a triggering event at 806, the UE transmits an uplink transmission, at 808, to the base station 804 that conveys information regarding the triggering event. Thus, the UE transmits the uplink transmission to the base station in response to the UE detecting the occurrence of the triggering event. The uplink transmission may be sent to the base station via PUCCH. In some examples, the PUCCH can be sent over multiple PUCCH resource IDs, e.g., in multiple PUCCH each having a corresponding resource ID. In some examples, the uplink transmission can be sent over multiple TCI beams, which can enhance diversity gain of the TCI beams. The uplink TCI beams on which the feedback information is sent may correspond to the downlink TCI beams used for PDCCH/PDSCH. This example may be applied, e.g., when the UE transmits and receives communication with the base station using corresponding beams. The PUCCH may convey information with regards to the triggering event, such as what led to the occurrence of the triggering event. For example, the PUCCH may include information with respect to the TCI beams, such as a L1-RSRP report of each TCI beam. In another example, the PUCCH may indicate which beams have failed and/or which beams caused the triggering event. In another example, the PUCCH may provide a UE recommendation for new beams for communication between the UE and the base station. The PUCCH may indicate a beam identifier. In some examples, the uplink transmission can be a CSI feedback report.

At 810, the base station receives the uplink transmission from the UE 802 and determines of a change of the TCI beam based on the feedback information provided from the UE at 808. At 812, if a change of the TCI beam is needed, the UE 802 receives information, from the base station, to convey a TCI change decision. The base station sends a signal to the UE with instructions to change the TCI beam based on the uplink transmission from the UE.

Figure 9A:
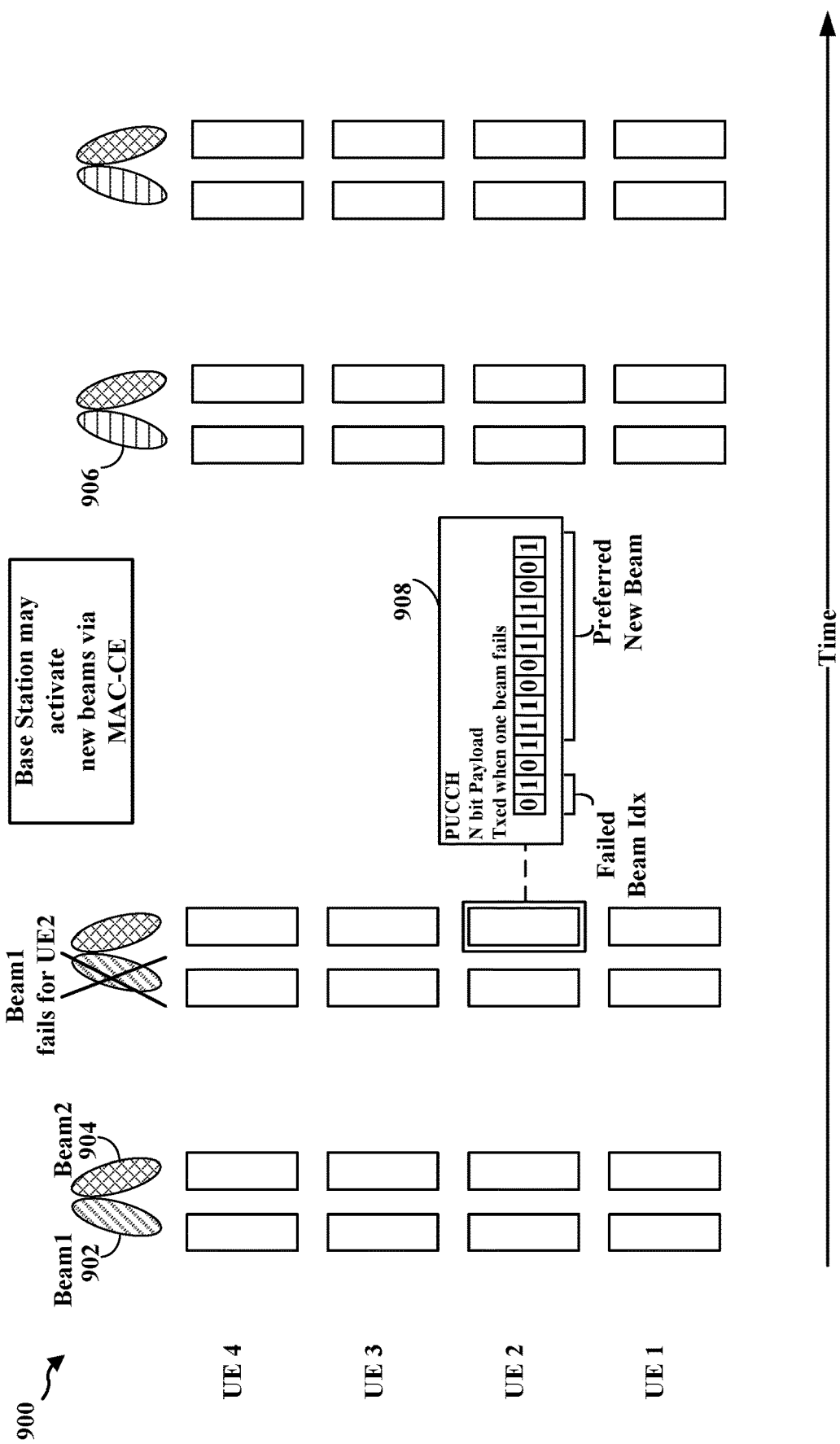
FIG. 9A illustrates another example of multi-beam transmission in accordance with certain aspects of the disclosure.

The uplink transmission 808 that conveys information related to the triggering event may be sent using different beams, different sequences, and/or different time-frequency resources. FIG. 9A provides an example 900 of an uplink transmission about a beam occurring in response to an occurrence of a triggering event. The base station may transmit a beamformed signal to the UEs (UE 1-UE 4) using a plurality of directional beams. In the example of FIG. 9A, the base station is transmitting a directional Beam 1 902 and a directional Beam 2 904. Each of the UEs can be configured to transmit a PUCCH to the base station, in response to the UE detecting the occurrence of a triggering event, on either of the beams 902, 904. The uplink transmission (e.g., a CSI feedback report for each beam) can be transmitted by the UEs to the base station on the PUCCH, as described in connection with FIG. 8. In FIG. 9A, UE 2 may determine a measurement for Beam 1 that indicates a beam failure. The measurement may be determined by the UE 2 to be a triggering event that causes the UE 2 to provide CSI feedback information to the base station. With reference to UE 2 of FIG. 9A, the PUCCH transmitted by UE 2 to the base station via Beam 2 904 can require a reservation of PUCCH resources in order to transmit the CSI feedback report. In the example of FIG. 9A, an N bit payload 908 can be utilized to reserve the PUCCH resources for the CSI feedback report. N is a number of the bits in the payload. As illustrated, payload 908 can include a plurality of bits. The example of FIG. 9A, illustrates a 14 bit payload 908. The N bit payload 908 may be transmitted in response to the triggering event, e.g., the measurement for Beam 1 indicating a beam failure. For example, UE 2 may wait until the triggering event to transmit the N bit payload 908. In some examples, the information related to the triggering event can be included within the N bit payload 908. For example, the bits within the N bit payload 908 can be configured to indicate to the base station which beam has failed, and/or a recommendation of a new beam.

In the example of FIG. 9A, the PUCCH transmission can provide an accurate reporting of the beams, such that the base station can readily determine whether a beam has failed. In the example of FIG. 9A, UE 2 detects that Beam 1 902 has failed, such that the failure of Beam 1 902 is a triggering event that prompts UE 2 to send the PUCCH. As Beam 1 902 has failed, the PUCCH may be sent via Beam 2 904. Thus, the selection of the beam for the transmission of the PUCCH may indicate to the base station the other beam that is blocked. In FIG. 9A, the base station would determine the failure of Beam 1 through the PUCCH being transmitted by UE 2 on Beam 2. As a result, the base station may be able to activate a new beam 906, e.g., Beam 3, that would take over for the failed beam Beam 1 902. In some configurations, the base station may activate the new beam(s) via MAC-CE. At least one advantage of the disclosure is that the UE can be configured to notify the base station upon the occurrence of a triggering event (e.g. beam failure), such that the base station can respond right away and without waiting for a scheduled feedback uplink transmission to receive indication of such event. At the same time, the report is not triggered until the UE has a measurement that indicates a beam failure. Even if there is a beam failure, one of the remaining beams may be used to provide feedback for the failed or fading beam. Additionally, because multiple beams can be used, communication may continue on any remaining good or unblocked beam(s) until a different second (or other number) beam is configured.

As discussed above in FIG. 7, the UEs continually transmit a PUCCH with feedback information to the base station to provide regular, periodic feedback. However, in the example of FIG. 9A, a PUCCH with feedback information may be transmitted in response to the UE detecting the occurrence of the triggering event. Thus, UEs in FIG. 9A might not continually transmit feedback information to the base station, and may wait to do so until a triggering event occurs. If no triggering events are detected, then the UE does not send feedback information, but if a triggering event is detected, then the UE will send the PUCCH having the feedback information related to the cause of the triggering event. The use of a triggering event to feedback regarding the beams may result in a power saving feature that can extend battery life of the UE by reducing uplink transmissions by the UE. However, the example of FIG. 9A may require that the UEs reserve PUCCH resources, similar to FIG. 7, and can result in increased overhead.

Figure 9B:
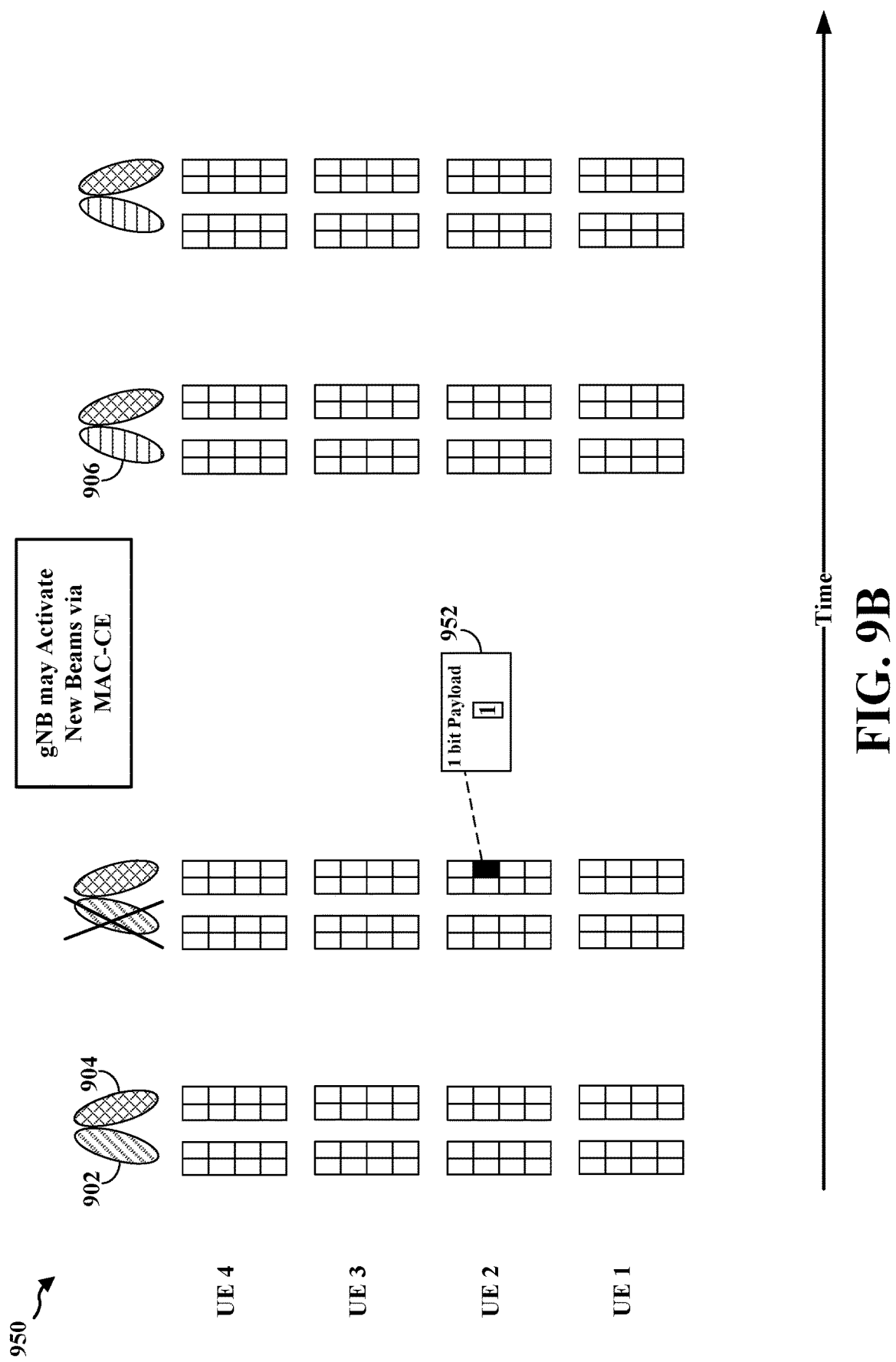
FIG. 9B illustrates another example of multi-beam transmission in accordance with certain aspects of the disclosure.

FIG. 9B provides another example 950 of an uplink transmission about a beam in response to an occurrence of a triggering event. In the example in FIG. 9B, the UE may use a particular time-frequency resource to transmit the uplink communication, and the selection of the time-frequency resource may convey information to the base station. The base station may transmit a beamformed signal to the UEs (UE1-UE4) using a plurality of directional beams. In the example of FIG. 9B, the base station is transmitting a directional Beam 1 902 and a directional Beam 2 904. Each of the UEs can be configured to transmit a PUCCH to the base station, in response to the UE detecting the occurrence of a triggering event, on at least one of the beams 902, 904. The example of FIG. 9B is similar to that of FIG. 9A, but has a distinction. In the example of FIG. 9B, the uplink resources of each UE for each beam can include multiple carrier frequencies. In FIG. 9B, the example is shown for 8 carrier frequencies. Each carrier frequency can correspond to a unique triggering event, such that when the UE transmits the PUCCH using a specific carrier frequency, or other specific time-frequency resource, the carrier frequency used for the transmission informs the base station of a particular triggering event that has occurred. Upon receipt of the received PUCCH transmission, the base station can determine if there is a need to activate a new beam. If such a new beam needs to be activated, the base station can activate the new beams, e.g., via a MAC-CE. In the example of FIG. 9B, the amount of uplink resources being reserved is much less than the example of FIG. 9A. In the example of FIG. 9B, a small payload of a few bits or even a single bit payload 952 can be utilized for the PUCCH transmission providing CSI feedback information. The 1 bit payload 952 has a reduced number of bits from the 14 bit example of FIG. 9A. Similarly, the UE may select a particular sequence for transmitting the PUCCH, and the sequence may convey triggering information to the base station.

Thus, the UE may provide CSI feedback information in an uplink transmission to the base station based on any combination of a beam used for the uplink transmission, a time-frequency resource used for the uplink transmission, and/or a sequence used for the uplink transmission.

Figure 10:
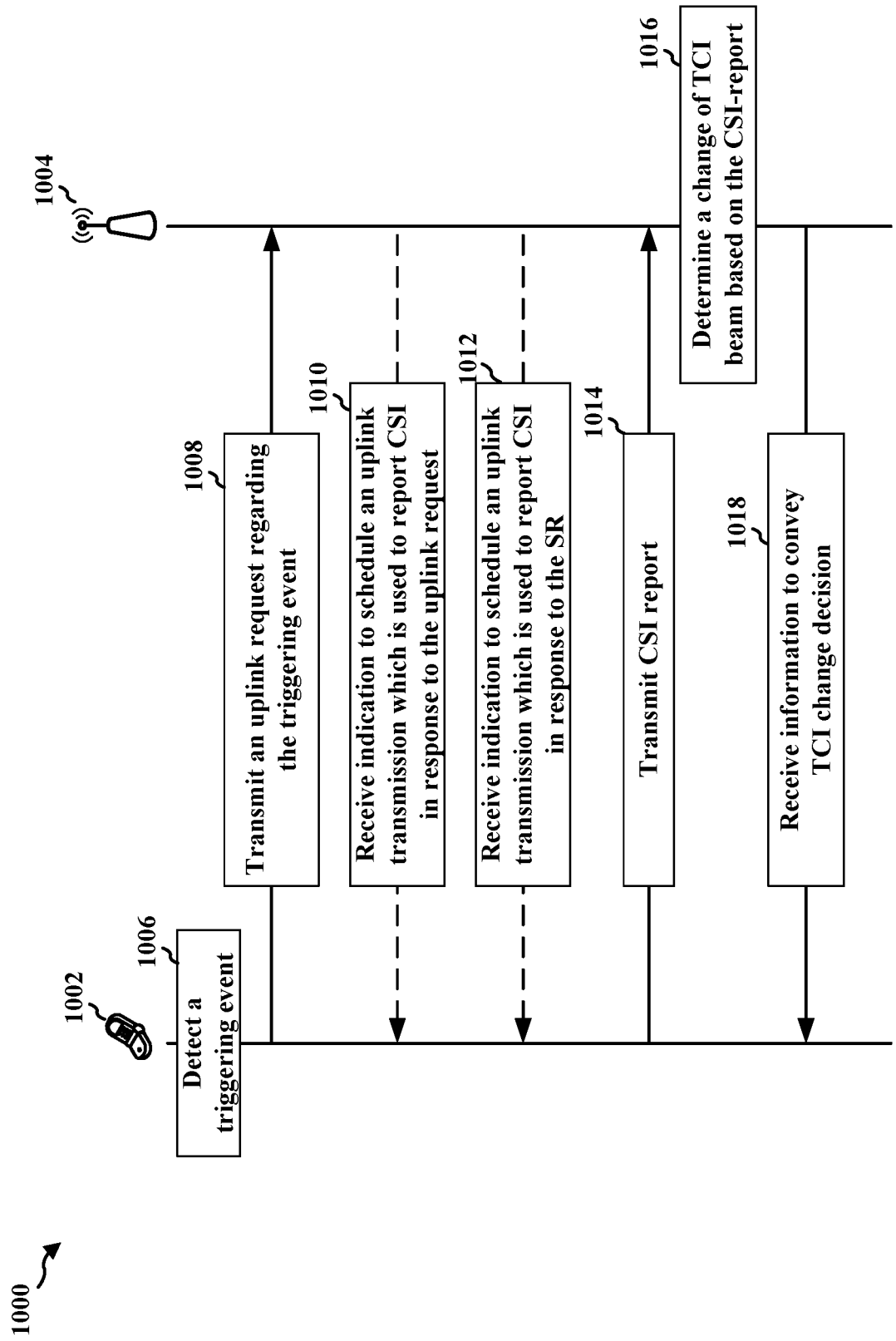
FIG. 10 illustrates another example communication flow between a base station and a UE.

FIG. 10 illustrates an example of communication 1000 between a base station 1004 and a UE 1002 that may be configured to transmit feedback information (e.g., a CSI feedback report) in response to a triggering event. Base station 1004 may correspond to base station 102, 180, 310, 402, 502, 804, 1350. The UE 1002 may correspond to UE 104, 350, 404, 504, 802, apparatus 1302/1302'. The communication between base station 1004 and UE 1002 may comprise mmW communication. The UE may receive communication from the base station using multiple beams. The UE may perform measurements of signals and/or channels received from the base station on the multiple beams, e.g., as described in connection with FIG. 6. At 1006, the UE 1002 can be configured to detect the occurrence of a triggering event. The triggering event can be many different types of predefined events and can be based on measurements from certain signals/channels (e.g., any of CSI-RS, SS, PDSCH, PDCCH, DMRS). In an example, the triggering event can occur when the UE detects that a certain measurement has fallen below a given threshold (e.g., L1-RSRP, CQI below a threshold value, etc.). In another example, the triggering event can be based on the measurement differences of the multiple beams. For example, if the strength/quality of the serving beams falls below the strength/quality of non-serving beams. In another example, the UE may detect a triggering event when a strength/quality difference between two beams is larger than a threshold. In another example, the triggering event can occur when the UE detects a change of the configuration in the UE RF modules In another example, the triggering event can occur when the UE predicts or estimates that a certain metric for one of the signals/channels will fall below a given threshold (e.g., a future RSRP is below a threshold value). For example, if the UE predicts that a future channel metric (e.g., RSRP) is less than a threshold value, a triggering event for a CSI report may be determined to have occurred. As such, the UE may then report the change in the future channel metric (e.g., RSRP) in an SR.

At 1008, the UE transmits an uplink request regarding the triggering event. The UE may transmit the uplink request instead of sending the entire feedback information related to the triggering event, as discussed in the example of communication 800. The uplink request may be transmitted in response to the UE detecting the occurrence of the triggering event. The uplink request can be a small payload of a few bits or even a single bit payload and can be sent to the base station via PUCCH. In some examples, the uplink request may be sent via a scheduling request on the PUCCH. The uplink request can be mapped to a single scheduling request that is sent using multiple PUCCH resource IDs, which can add diversity and enhance robustness of the CSI report. The uplink request can be mapped to multiple scheduling requests, such that each scheduling request uses the same PUCCH resource ID. In some examples, the uplink request can be sent over multiple TCI beams or resources.

The UE may send the uplink request including a scheduling request on a particular beam or using a particular time-frequency resource. As described in connection with FIGS. 9A and 9B, the selection of a beam and/or time-frequency resource for the uplink request may indicate to the base station information about the triggering event. For example, the beam and/or time-frequency resource of the uplink request may indicate to the base station the beam that has failed.

At 1010, the UE may receive an indication to schedule an uplink transmission which can be used to report the CSI in response to the uplink request. Alternatively, at 1012, the UE may receive an indication to schedule an uplink transmission which can be used to report the CSI in response to a scheduling request. In some examples, the indication can be transmitted on a PDCCH by the base station, such that the CSI report will be scheduled to be transmitted to the base station via PUCCH. In some examples, the indication can include an uplink grant, such that the UE will respond with the CSI report included in a MAC-CE. The base station sends a communication to the UE, in response to the uplink request from the UE, which schedules a second uplink transmission which the UE will use to report the CSI. The UE receives instructions from the base station, in the form of the indication, which informs the UE as to which resources the UE is to use to transmit the CSI report. The choices of a beam or a time-frequency resource for the indication and the CSI report can be predefined.

At 1014, the UE transmits the CSI report to the base station in accordance with the received indication which schedules the uplink transmission for the UE. The CSI report includes information with regard to the triggering event. In some examples the CSI report may include L1-RSRP of at least one TCI beam, indication of a blocked beam, or a recommended beam.

The choices of a second beam and/or a second time-frequency resource for the indication or the CSI report can be based on the first beam or the first time-frequency resource of the scheduling request. The TCI beams can be configured to correspond to the beams used for communicating the PDSCH/PDCCH. The choice of the TCI beams/resources to send the scheduling request may contain information of the triggering event, for example, the beam that has failed.

In another example, the choice of a second beam or second time-frequency resource for the indication or the CSI report can be predefined.

At 1016, the base station receives the uplink transmission from the UE and determines a change of the TCI beam based on the CSI report. At 1018, if a change of the TCI beam is needed, the UE receives information to convey a TCI change decision. The base station sends a signal to the UE via PDCCH with instructions to change the TCI beam based on the CSI report transmitted from the UE. At least one advantage of the communication 1000 is that the transmission of the CSI report is in response to the occurrence of a triggering event, which avoids the need to continually reserve resources to be able to send the CSI report on PUCCH. In addition, the initial uplink request from the UE is small, e.g., even 1 bit, and provides an efficient scheme to trigger transmission of the CSI report. This in turn, reduces the amount of uplink transmissions by the UE, which not only reduces the amount of frequency resources used, but is an efficient use of battery power that can be considered a power saving feature that can extend battery life of the UE.

Figure 11:
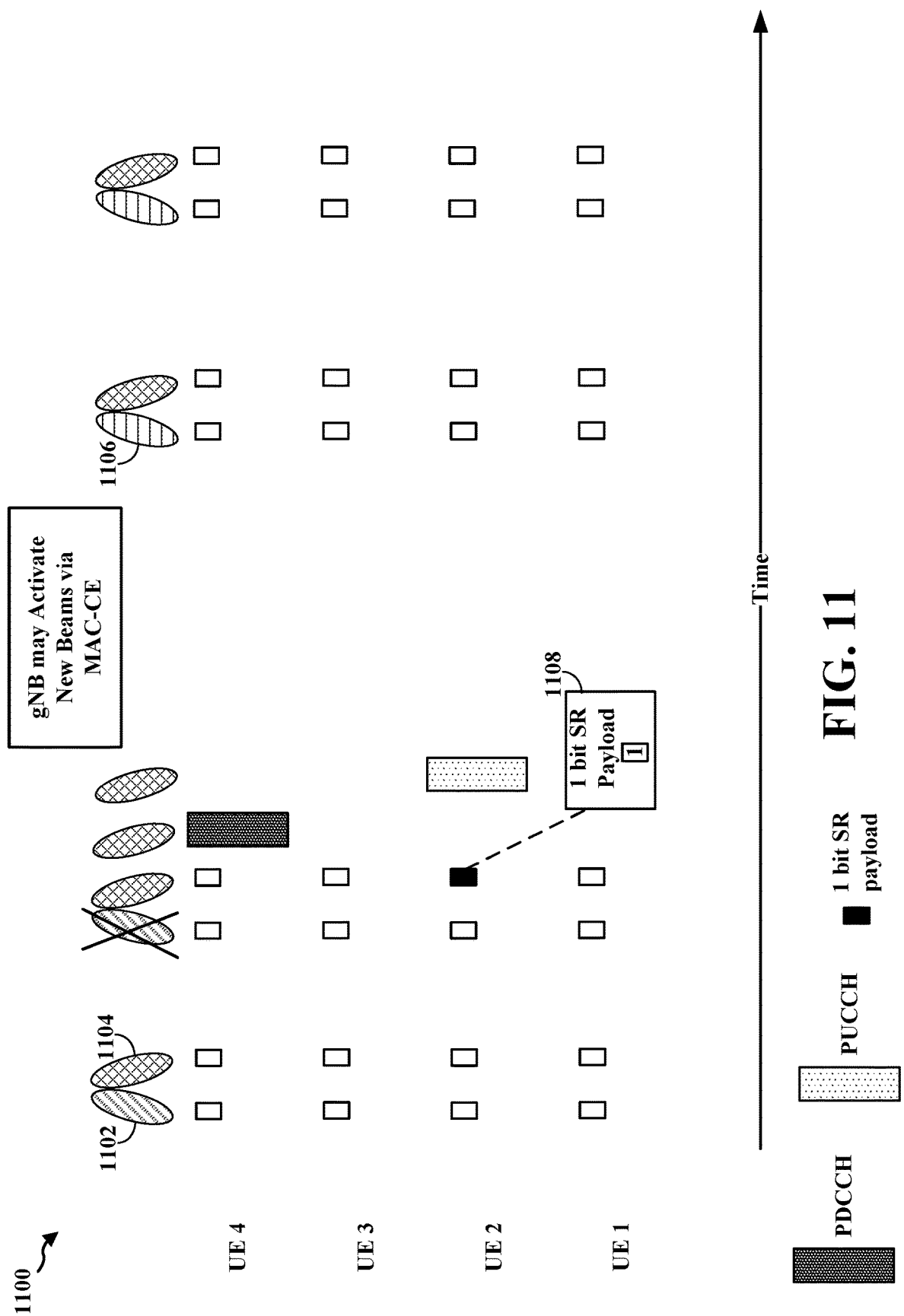
FIG. 11 illustrates another example of multi-beam transmission in accordance with certain aspects of the disclosure.

FIG. 11 provides an example 1100 of an uplink transmission of information about a beam in response to an occurrence of a triggering event. The base station may transmit a beamformed signal to the UEs (UE 1-UE 4) using a plurality of directional beams. In the example of FIG. 11, the base station transmits a directional Beam 1 1102 and a directional Beam 2 1104. Each of the UEs can be configured to transmit an uplink request to the base station, in response to the UE detecting the occurrence of a triggering event, on each of the beams 902, 904. The uplink request can be transmitted by the UEs to the base station on the PUCCH. UE 2 may detect a triggering event indicating a problem with Beam 1. This may cause UE 2 to transmit an uplink request, as described in connection with FIG. 10. As such, UE 2 may send a payload 1108 schedule request to the base station. The payload may comprise a few bits or even a single bit. Since Beam 1 1102 has failed, the schedule request/uplink request is sent on the non-failing beam Beam 2 1104. Then UE 2 receives an indication for an uplink transmission from the base station via PDCCH on Beam 2 1104. UE 2 then transmits the CSI report to the base station via PUCCH on Beam 2 1104, in accordance with the instructions provided by the base station in the indication. The CSI report transmitted by UE 2 informs the base station that Beam 1 1102 has failed, such that the base station activates a new beam Beam 3 1106. The base station can activate new beams via MAC-CE. The choice of which beam to send the PDCCH/PUCCH can be predefined (e.g., always use a particular beam), or can be based on which beam the first uplink request transmission was received. For example, if the uplink request/scheduling request was received on a beam, then the base station can indicate that such beam is a good beam and can send the indication via PDCCH to the UE on the same beam.

Figure 12:
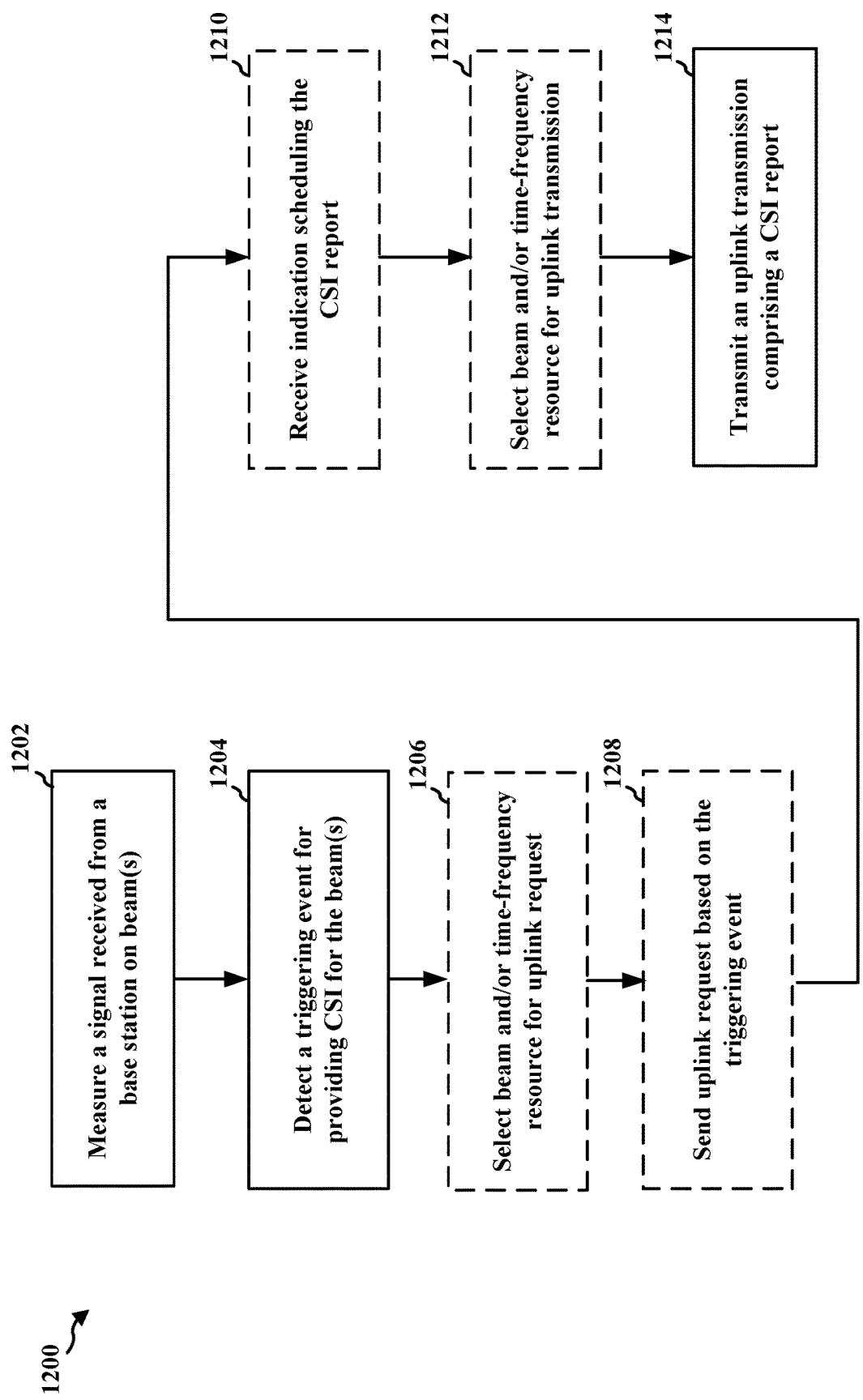
FIG. 12 is a flowchart of a method of wireless communication.

FIG. 12 is a flowchart 1200 of a method of wireless communication. The method may be performed by a UE (e.g., UE 104, 350, 404, 504, 802, 1002, 1650; the apparatus 1302/1302'; the processing system 1414, which may include the memory 360 and which may be the entire UE or a component of the UE, such as TX processor 368, the RX processor 356, and/or the controller/processor 359) communicating with a base station (e.g., the base station 102, 180, 310, 402, 502, 804, 1004, 1350; the apparatus 1602/1602'). One or more of the illustrated operations may be omitted, transposed, or contemporaneous. In FIG. 12, optional aspects are illustrated with a dashed line.

At 1202, the UE measures a signal received from a base station on at least one beam. For example, 1202 may be performed by measurement component 1308 of apparatus 1302. For example, measurement component 1308 of apparatus 1302 may measure the signal. The UE may be communicating with a base station using mmW directional beamforming. The UE may be receiving multi-beam transmissions. Thus, the UE may receive transmissions from the base station on multiple beams, as described in connection with FIGS. 4, 5, and 6. The UE may perform measurements for each of the multiple beams, e.g., based on signals received on the corresponding beam. The UE may measure RSRP, CQI, etc. for each of the beams.

At 1204, the UE detects a triggering event for providing CSI for the at least one beam. For example, 1204 may be performed by trigger component 1309 of apparatus 1302. FIGS. 8 and 10 illustrate examples 806 and 1006 of detecting a triggering event. The uplink transmission may be triggered by any of various different measurements for a corresponding beam. For example, detecting the triggering event may include detecting a measurement of the signal that meets or satisfies a threshold. The signal from the base station may comprise at least one of a CSI-RS, SS, PDSCH, PDCCH, or DM-RS. In another example, detecting the triggering event may include detecting at least one of a RSRP or a CQI being below a threshold. In another example, detecting the triggering event may include detecting an identification of a beam other than a serving beam that has a better quality measurement than the serving beam. In another example, detecting the triggering event may include detecting an RSRP difference between two beams being larger than a threshold.

At 1214, the UE transmits an uplink transmission comprising a CSI report in response to detecting the triggering event at 1204. For example, 1214 may be performed by CSI report component 1310 of apparatus 1302. The uplink transmission may be transmitted via PUCCH. The uplink transmission may be transmitted using multiple PUCCH resource IDs. The uplink transmission may be transmitted over multiple TCI beams. The CSI report may comprise an indication of any combination of an RSRP of the at least one beam, an indication of a blocked beam, and/or a recommended beam. FIG. 8 illustrates a transmission 808 that may comprise the CSI report. Similarly, FIG. 10 illustrates an example transmission 1014 comprising a CSI report.

As illustrated at 1212, the UE may select a beam and/or time-frequency resource for the uplink transmission. For example, 1212 may be performed by selection component 1312 of apparatus 1302. The beam and/or the time-frequency resource selected for the uplink transmission may convey information regarding the CSI at least one beam, e.g., as described in connection with FIG. 9A, 9B, or 11. Thus, the uplink transmission may convey information regarding the CSI quality of at least one beam based on at least one of a TCI beam used to transmit the uplink transmission, resources used to transmit the uplink transmission, and/or a sequence used to transmit the uplink transmission.

As illustrated at 1208, the UE may send an uplink request based on the triggering event detected at 1204, prior to transmitting the uplink transmission at 1214. For example, 1208 may be performed by uplink request component 1314 of apparatus 1302. FIG. 8 illustrates an example in which a UE may transmit CSI information without first transmitting an uplink request. FIG. 10 illustrates an example in which a UE transmits an uplink request 1008 in response to detecting a triggering event. The uplink request may comprise a single bit. The uplink request may be transmitted in an SR or a PUCCH. In an example, the uplink request may be mapped to a SR, where the SR is transmitted using multiple PUCCH resource IDs. In another example, the uplink request may be mapped to multiple SRs, with each SR using a same PUCCH resource ID.

Similar to the selection at 1212, at 1206, the UE may select at least one of a beam or time-frequency resource for the uplink request. For example, 1206 may be performed by selection component 1312 of apparatus 1302. The beam and/or the time-frequency resource selected for the uplink request may convey information regarding the triggering event.

In response to the uplink request transmitted at 1206, the UE, at 1210, may receive an indication scheduling the CSI report in response to the uplink request. For example, 1210 may be performed by scheduling component 1316 of apparatus 1302. FIG. 10 illustrates example indications 1010 and 1012. The CSI report may be transmitted at 1214 according to the indication. The choices for a beam and/or a time-frequency resource for the indication and the CSI report may be predefined. Thus, the UE may receive the indication and/or transmitting the CSI report via a predefined beam and/or predefined time-frequency resource. In another example, the choices of a second beam or a second time-frequency resource for the indication or the CSI report may be based on the first beam or the first time-frequency resource of the SR.

The indication, received at 1210, may be transmitted on PDCCH, and the CSI report, at 1214, may be transmitted on a PUCCH. The indication, received at 1210, may comprise an uplink grant and the CSI report, transmitted at 1214, may comprise a MAC-CE.

Figure 13:
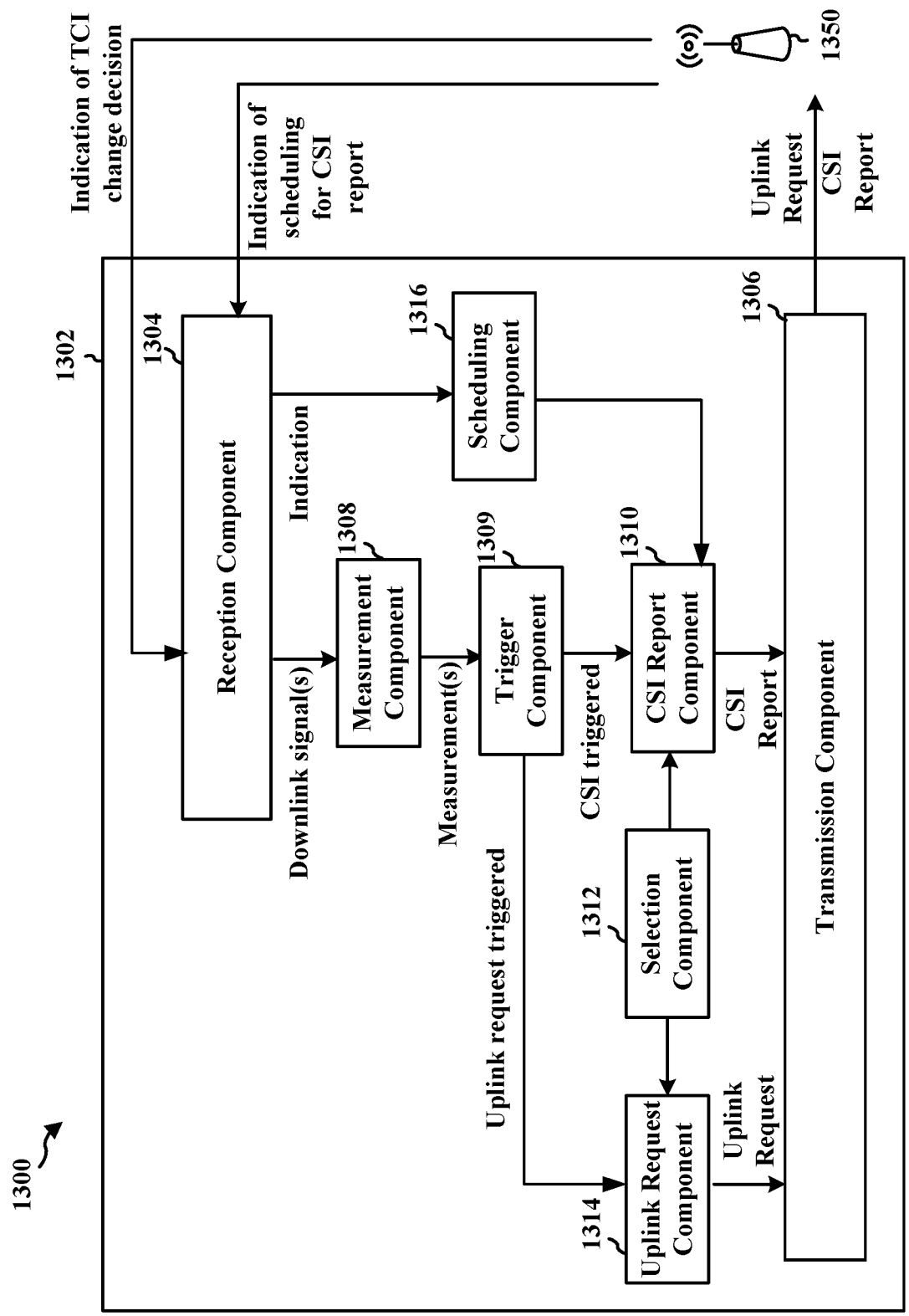
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., UE 104, 350, 404, 504, 802, 1002, 1650; the apparatus 1302/1302'; the processing system 1414, which may include the memory 360 and which may be the entire UE or a component of the UE, such as TX processor 368, the RX processor 356, and/or the controller/processor 359). Alternately, the apparatus may be a component of a UE. The apparatus includes a reception component 1304 that receives downlink communication from base station 1350, e.g., as described in connection with 1202 of FIG. 12. The apparatus includes a transmission component 1306 that transmits uplink communication to the base station 1350, e.g., as described in connection with 1214 of FIG. 12. The apparatus may include a measurement component 1308 that is configured to measure a signal received from a base station on at least one beam, e.g., as described in connection with 1202 in FIG. 12. The apparatus includes a trigger component 1309 configured to detect a triggering event for providing CSI for the at least one beam, e.g., as described in connection with 1204 in FIG. 12. The apparatus may include a CSI report component 1310 for transmitting an uplink transmission comprising a CSI report in response to detecting the triggering event, e.g., as described in connection with 1214 of FIG. 12. The apparatus may include selection component 1312 for selecting at least one of a beam or time-frequency resource for the uplink transmission, e.g., as described in connection with 1212 of FIG. 12. The beam or the time-frequency resource selected for the uplink transmission may convey information regarding the CSI at least one beam. The apparatus may include an uplink request component 1314 sending an uplink request based on the triggering event prior to transmitting the uplink transmission, e.g., as described in connection with 1208 of FIG. 12. The selection component 1312 may further select at least one of a beam or time-frequency resource for the uplink request, e.g., as described in connection with 1212 of FIG. 12. The beam or the time-frequency resource selected for the uplink request conveys information regarding the triggering event. The apparatus may include a scheduling component 1316 for receiving an indication scheduling the CSI report in response to the uplink request, e.g., as described in connection with 1210 of FIG. 12. The CSI report may be transmitted according to the indication.

The apparatus may include additional components that perform each of the blocks of the algorithm in the aforementioned flowcharts of FIGS. 8, 10, and 12. As such, each block in the aforementioned flowcharts of FIGS. 8, 10, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
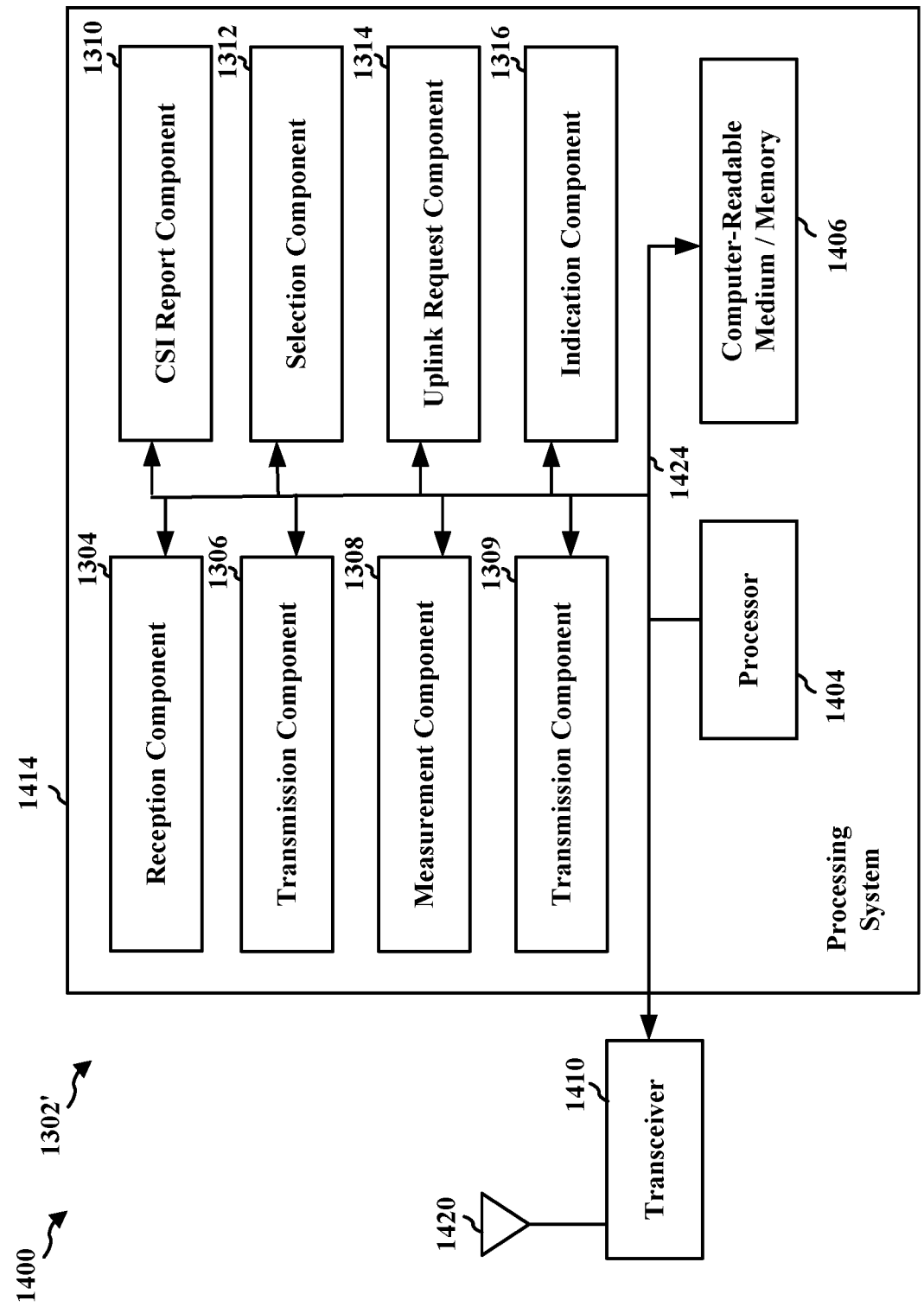
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1309, 1310, 1312, 1314, 1316, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1309, 1310, 1312, 1314, 1316. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for measuring a signal received from a base station on at least one beam. The apparatus may include means for detecting a triggering event for providing CSI for the at least one beam. The apparatus may include means for transmitting an uplink transmission comprising a CSI report in response to detecting the triggering event. The apparatus may further include means for selecting at least one of a beam or time-frequency resource for the uplink transmission. In some examples, the beam or the time-frequency resource selected for the uplink transmission conveys information regarding the CSI at least one beam. The apparatus may further include means for sending an uplink request based on the triggering event prior to transmitting the uplink transmission. The apparatus may further include means for selecting at least one of a beam or time-frequency resource for the uplink request. In some examples, the beam or the time-frequency resource selected for the uplink request conveys information regarding the triggering event. The apparatus may further include means for receiving an indication scheduling the CSI report in response to the uplink request. In some examples, the CSI report is transmitted according to the indication. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 config- ured to perform the functions recited by the aforementioned means. Alternatively, the processing system 1414 may be the entire UE (e.g., see 350 of FIG. 3)

Figure 15:
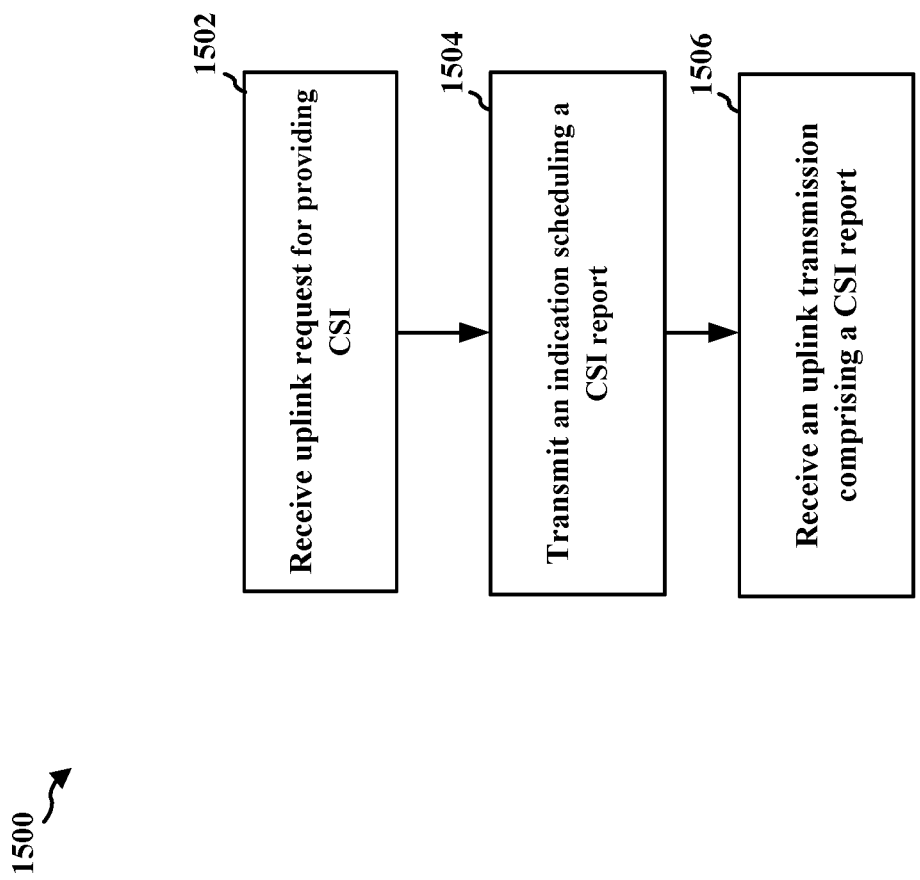
FIG. 15 is a flowchart of a method of wireless communication.

FIG. 15 is a flowchart 1500 of a method of wireless communication. The method may be performed by a base station (e.g., the base station 102, 180, 310, 402, 502, 804, 1004, 1350; the apparatus 1602/1602'; the processing system 1714, which may include the memory 376 and which may be the entire base station or a component of the base station, such as the TX processor 316, the RX processor 370, and/or the controller/processor 375) in wireless communication with a UE (e.g., UE 104, 350, 404, 504, 802, 1002, 1650; the apparatus 1302/1302'). One or more of the illustrated operations may be omitted, transposed, or contemporaneous.

At 1502, the base station receives an uplink request from a UE for providing CSI for at least one beam. For example, 1502 may be performed by uplink request component 1608 of apparatus 1602. The uplink request may comprise a single bit. The uplink request may be received in PUCCH. The uplink request may be received in an SR. The uplink request may be mapped to a single SR using multiple PUCCH resource IDs. In another example, the uplink request may be mapped to multiple SRs, where each SR uses the same PUCCH resource ID.

The uplink request may be triggered by any of various different beam measurements by the UE. For example, the uplink request may be triggered by a measurement of the signal that meets a threshold, e.g., the signal may comprise at least one of a CSI-RS, SS, PDSCH, PDCCH, or DM-RS. In another example, the uplink request may be triggered by at least one of a RSRP or a CQI being below a threshold. In another example, the uplink request may be triggered by an identification of a beam other than a serving beam that has a better quality measurement than the serving beam. In another example, the uplink request may be triggered by an RSRP difference between two beams being larger than a threshold. A beam or time-frequency resource for the uplink request may convey information regarding the triggering event. Thus, the base station may determine information regarding a triggering event based on the beam and/or time-frequency resource on which the uplink request is received.

At 1504, the base station may transmit an indication scheduling a CSI report in response to the uplink report. For example, 1504 may be performed by scheduling component 1610 of apparatus 1602.

At 1506, the base station receives an uplink transmission from the UE comprising a CSI report for the at least one beam. For example, 1506 may be performed by CSI report component 1612 of apparatus 1602. The uplink transmission may be received on PUCCH. The uplink transmission may be received using multiple PUCCH resource IDs. The uplink transmission may be received over multiple TCI beams. The CSI report may comprise an indication of any combination of an RSRP of the at least one beam, an indication of a blocked beam, and/or a recommended beam. FIG. 8 illustrates a transmission 808 that may comprise the CSI report. Similarly, FIG. 10 illustrates an example transmission 1014 comprising a CSI report.

The uplink transmission at 1506 may convey information to the base station regarding the CSI quality of the at least one beam based on at least one of a TCI beam used to transmit the uplink transmission, resources used to transmit the uplink transmission, or a sequence used to transmit the uplink transmission, e.g., as described in connection with FIG. 9A, 9B, or 11.

Choices of a beam or a time-frequency resource for the indication, at 1504, and/or the CSI report, at 1506, may be predefined. Thus, the base station may use a predefined beam and/or a predefined time-frequency resource to transmit the indication and/or to receive the CSI report. In another example, the uplink request, at 1502, may comprise an SR received on a first beam or using a first time-frequency resource, and of a second beam or a second time-frequency resource for the indication, at 1504, or the CSI report, at 1506, may be based on first beam or the first time-frequency resource of the SR. Thus, the base station may select a second beam and/or a second time-frequency resource for the indication based on the first beam and/or first time-frequency resource on which it receives the uplink request.

The indication may be transmitted at 1504 on PDCCH and the CSI report may be received at 1506 on PUCCH. The indication transmitted at 1504 may comprise an uplink grant and the CSI report received at 1506 may comprise a MAC-CE.

Figure 16:
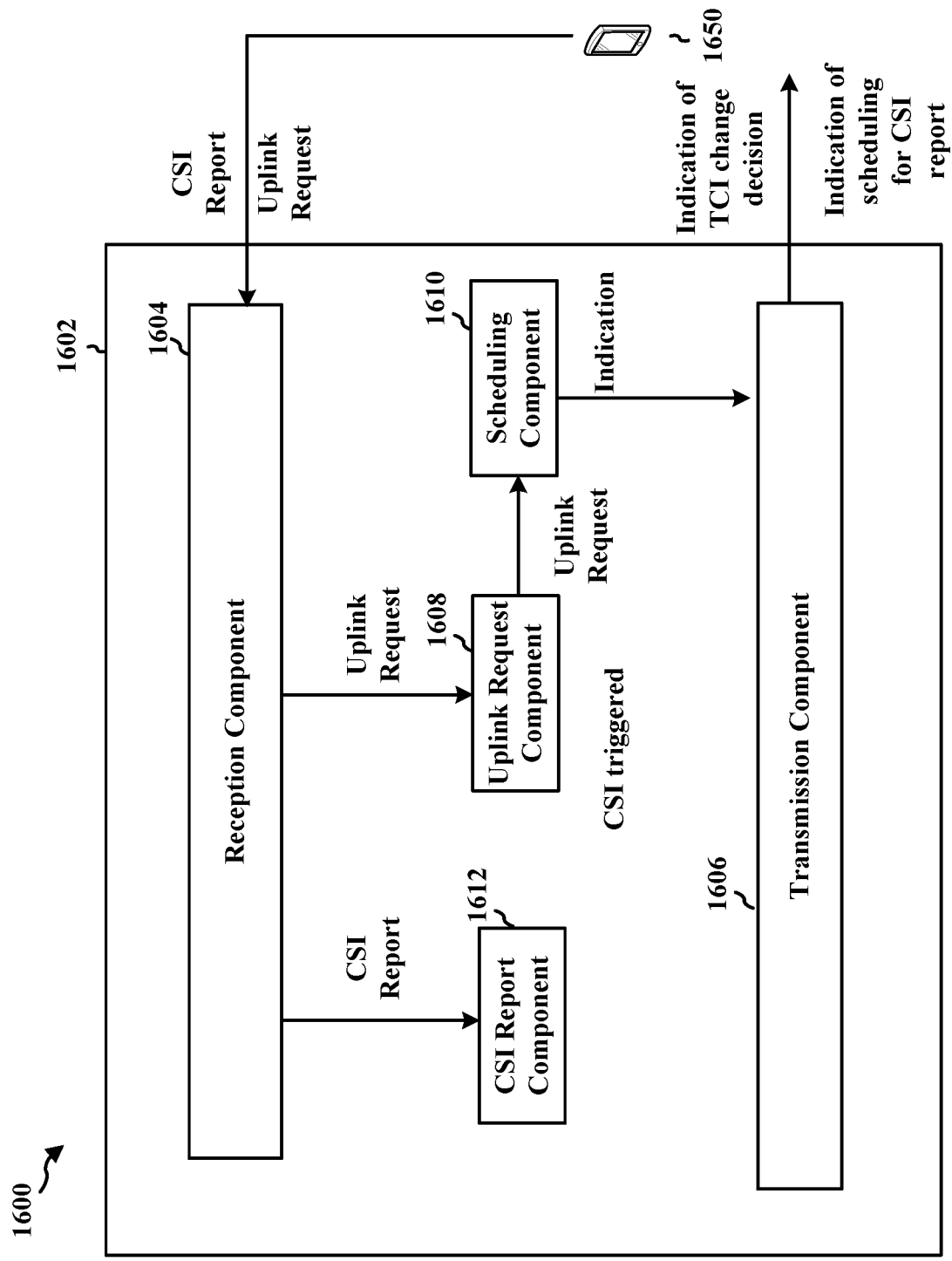
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a base station. Alternatively, the apparatus may be a component of a base station. The apparatus includes a reception component 1604 that receives uplink communication from UE, e.g., as described in connection with 1502 of FIG. 15. The apparatus includes a transmission component 1606 that transmits downlink communication to the UE, e.g., as described in connection with 1504 of FIG. 15. The apparatus includes an uplink request component 1608 that receives an uplink request from a UE for providing CSI for at least one beam, e.g., as described in connection with 1506 of FIG. 15. The apparatus includes a scheduling component 1610 that transmits an indication scheduling a CSI report in response to the uplink request, e.g., as described in connection with 1504 of FIG. 15. The apparatus includes a CSI report component 1612 that receives an uplink transmission from the UE comprising a CSI report for the at least one beam, e.g., as described in connection with 1506 of FIG. 15.

The apparatus may include additional components that perform each of the blocks of the algorithm in the aforementioned flowcharts of FIGS. 8, 10, and 15. As such, each block in the aforementioned flowcharts of FIGS. 8, 10, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
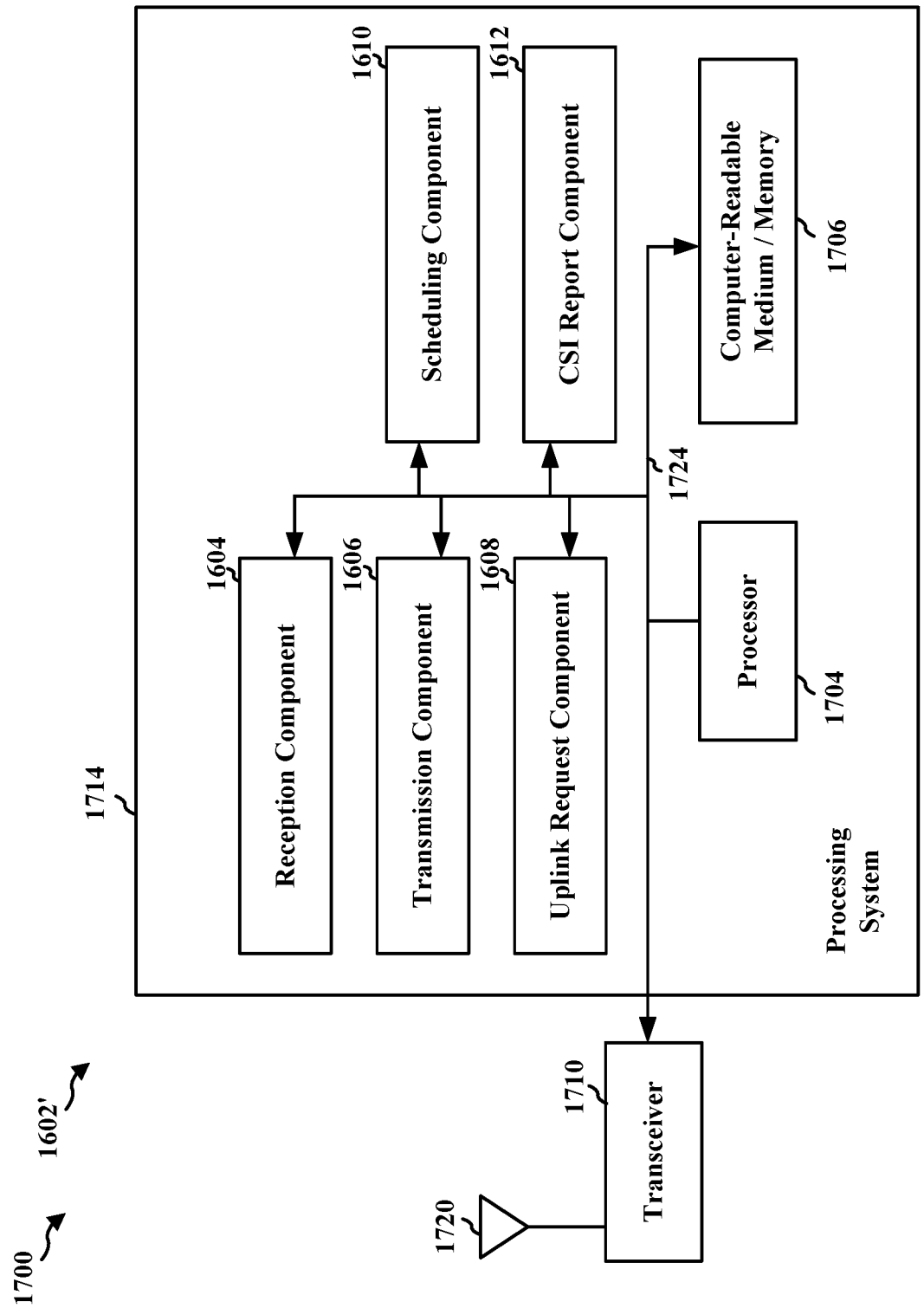
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375.

In one configuration, the apparatus 1602/1602' for wireless communication includes means for means for receiving an uplink request from a UE for providing CSI for at least one beam, means for transmitting an indication scheduling a CSI report in response to the uplink request, and means for receiving an uplink transmission from the UE comprising a CSI report for the at least one beam. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. Alternatively, the processing system 1714 may be the entire base station (e.g., see 310 of FIG. 3).

The following examples illustrate example embodiments. The following examples are illustrative only and aspects of these examples may be used in combination with any of the other embodiments or teaching described herein, without limitation.

Example 1 is a method of wireless communication at a UE that includes measuring a signal received from a base station on at least one beam, detecting a triggering event for providing CSI for the at least one beam, and transmitting an uplink transmission comprising a CSI report in response to detecting the triggering event.

In Example 2, the triggering event of example 1 includes a measurement of the signal that meets a threshold.

In Example 3, the method of example 2 further includes that measuring the signal from the base station comprises measuring at least one of a CSI-RS, a SS, a PDSCH, a PDCCH, or a DM-RS.

In Example 4, the method of any of examples 1-3 may include that detecting the triggering event comprises detecting that at least one of a measured RSRP or a CQI is below a threshold.

In Example 5, the method of any of examples 1-4 may include that detecting the triggering event comprises detecting that a beam other than a serving beam that has a better quality measurement than the serving beam.

In Example 6, the method of any of examples 1-5 may include that detecting the triggering event comprises detecting that an RSRP difference between two beams is larger than a threshold.

In Example 7, the method of any of examples 1-6 may include transmitting the uplink transmission via PUCCH.

In Example 8, the method of example 7 further includes transmitting the uplink transmission using multiple PUCCH resource IDs.

In Example 9, the method of any of examples 1-8 may include transmitting the uplink transmission over multiple TCI beams.

In Example 10, the method of any of examples 1-9 may include selecting at least one of a beam or time-frequency resource for the uplink transmission, wherein the beam or the time-frequency resource selected for the uplink transmission conveys information regarding the CSI at least one beam.

In Example 11, the method of any of examples 1-10 may include conveying information regarding the CSI quality of at least one beam in the uplink transmission based on at least one of a TCI beam used to transmit the uplink transmission, resources used to transmit the uplink transmission, or a sequence used to transmit the uplink transmission.

In Example 12, the method of any of examples 1-11 may include sending an uplink request based on the triggering event prior to transmitting the uplink transmission.

In Example 13, the method of example 12 further includes that the uplink request comprises a single bit.

In Example 14, the method of any of examples 12-13 may include transmitting the uplink request in a scheduling request or a PUCCH.

In Example 15, the method of any of examples 12-14 may include mapping the uplink request to a single SR, wherein the SR is transmitted using multiple PUCCH resource IDs.

In Example 16, the method of any of examples 12-15 may include mapping the uplink request to a single SR, wherein the SR is transmitted using multiple PUCCH resource IDs.

In Example 17, the method of any of examples 12-16 may include selecting at least one of a beam or time-frequency resource for the uplink request, wherein the beam or the time-frequency resource selected for the uplink request conveys information regarding the triggering event.

In Example 18, the method of any of examples 12-17 may include receiving an indication scheduling the CSI report in response to the uplink request, wherein the CSI report is transmitted according to the indication.

In Example 19, the method of example 18 may include that receiving the indication or transmitting the CSI report comprises receiving or transmitting via a predefined beam or a predefined time-frequency resource.

In Example 20, the method of any of examples 18-19 may include the uplink request comprising a SR transmitted on a first beam or using a first time-frequency resource, and wherein choices of a second beam or a second time-frequency resource for the indication or the CSI report are based on first beam or the first time-frequency resource of the SR.

In Example 21, the method of any of examples 18-20 may include that the indication is transmitted on a PDCCH and the CSI report is transmitted on a PUCCH.

In Example 22, the method of any of examples 18-21 may include the indication comprising an uplink grant and the CSI report comprising a MAC-CE.

In Example 23, the method of any of examples 1-22 may include the CSI report comprises an indication of at least one of an RSRP of the at least one beam, an indication of a blocked beam, or a recommended beam.

Example 24 is a device including one or more processors and memory in electronic communication with the one or more processors storing instructions executable by the one or more processors to cause the system or apparatus to implement a method as in any of examples 1-23.

Example 25 is a method of wireless communication at a Base Station that includes receiving an uplink request from a UE for providing CSI for at least one beam, transmitting an indication scheduling a CSI report in response to the uplink request, and receiving an uplink transmission from the UE comprising the CSI report for the at least one beam.

In Example 26, the method of example 25 may include that the uplink request is triggered by an identification, at the UE, of a beam other than a serving beam that has a better quality measurement than the serving beam.

In Example 27, the method of any of examples 25-26 may include determining information regarding a triggering event from a beam or a time-frequency resource of the uplink request.

In Example 28, the method of example 27 may include that a predefined beam or a predefined time-frequency resource is used to transmit the indication and the CSI report.

In Example 29, the method of example 27 may include that receiving the uplink request comprises receiving the uplink request in a SR received on a first beam or using a first time-frequency resource, and selecting a second beam or a second time-frequency resource for the indication or the CSI report based on the first beam or the first time-frequency resource of the SR.

In Example 30, the method of any of examples 25-29 may include that the indication is transmitted on a PDCCH and the CSI report is received on a PUCCH.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
   measuring a signal received from a base station via a beam;
   detecting a triggering event for providing channel state information (CSI) for the beam, wherein the triggering event comprises a beam failure;
   sending an uplink request based on the triggering event to reserve uplink resources for reporting of the CSI, wherein the uplink request is sent via a scheduling request (SR) for which selection of a physical uplink control channel (PUCCH) resource on which the SR is sent indicates that the beam is associated with an occurrence of the triggering event;
   receiving an indication scheduling a CSI report in response to the uplink request; and
   transmitting an uplink transmission comprising the CSI report in response to detecting the triggering event, wherein the CSI report is transmitted according to the indication.

2. The method of claim 1, wherein detecting the triggering event comprises detecting that a measurement of the signal meets a threshold.

3. The method of claim 1, wherein detecting the triggering event comprises detecting that at least one of a reference signal received power (RSRP) or a channel quality indicator (CQI) is below a threshold.

4. The method of claim 1, wherein the indication comprises an uplink grant and the CSI report comprises a medium access control-control element (MAC-CE).

5. The method of claim 1, wherein the CSI report comprises an indication of a recommended beam.

6. The method of claim 1, wherein the triggering event is detected based on the measuring the signal.

7. The method of claim 1, wherein the transmitting comprises transmitting, to the base station, on a plurality of uplink transmission configuration indicator (TCI) beams via a physical uplink control channel (PUCCH), the CSI report, and wherein a first uplink TCI beam of the plurality of uplink TCI beams corresponds to the beam from which the signal is received.

8. The method of claim 7, wherein the CSI report comprises information of each of the plurality of uplink TCI beams, wherein the information indicates the first uplink TCI beam is associated with the beam failure.

9. The method of claim 7, further comprising receiving, from the base station, instructions for the UE to change at least one of the plurality of uplink TCI beams based on the uplink transmission from the UE.

10. The method of claim 1, wherein the beam from which the signal is received from the base station is a first downlink beam, wherein the uplink transmission is transmitted on an uplink beam that corresponds to a second downlink beam different from the first downlink beam, and wherein selection of the uplink beam implicitly indicates to the base station that the first downlink beam is associated with the occurrence of the triggering event.

11. The method of claim 1, further comprising receiving, from the base station, a downlink control signal comprising an indication in a medium access control-control element (MAC-CE) of the downlink control signal, the indication indicating activation of one or more new beams based on the occurrence of the triggering event.

12. The method of claim 1, further comprising receiving, from the base station, an uplink grant indicating allocation of uplink resources for each of a plurality of uplink beams, wherein the uplink resources of each of the plurality of uplink beams includes a particular time-frequency resource that corresponds to a unique triggering event, wherein the uplink transmission is transmitted using the particular time-frequency resource that corresponds to the detected triggering event and implicitly indicates to the base station the occurrence of the triggering event.

13. The method of claim 1, further comprising receiving, from the base station, an uplink grant indicating allocation of uplink resources for each of a plurality of uplink beams, wherein the uplink resources of each of the plurality of uplink beams includes a plurality of carrier frequencies that each respectively correspond to a unique triggering event, wherein the uplink transmission is transmitted using a particular carrier frequency of the plurality of carrier frequencies that corresponds to the detected triggering event and implicitly indicates to the base station the occurrence of the triggering event.

14. The method of claim 1, wherein the uplink request is mapped to the SR, wherein the SR is transmitted using multiple PUCCH resource identifiers.

15. The method of claim 1, wherein the SR is a first SR, wherein the uplink request is mapped to multiple SRs including the first SR, and wherein each of the multiple SRs uses a same PUCCH resource identifier.

16. An apparatus for wireless communication at a user equipment (UE), the apparatus comprising:
   a transceiver;
   one or more memories, individually or in combination, having instructions; and
   one or more processors, individually or in combination, configured to execute the instructions and cause the apparatus to:
      measure a signal received via a beam from a base station, the signal received via the transceiver;
      detect a triggering event for providing channel state information (CSI) for the beam, wherein the triggering event comprises a beam failure;

send, via the transceiver an uplink request based on the triggering event to reserve uplink resources for reporting of the CSI, wherein the uplink request is sent via a scheduling request (SR) for which selection of a physical uplink control channel (PUCCH) resource on which the SR is sent indicates that the beam is associated with an occurrence of the triggering event;

receive, via the transceiver, an indication scheduling a CSI report in response to the uplink request; and transmit, via the transceiver, an uplink transmission comprising the CSI report in response to detecting the triggering event, wherein the CSI report is transmitted according to the indication.

17. The apparatus of claim 16, wherein the one or more processors, being configured to detect the triggering event, are further configured to detect that a measurement of the signal meets a threshold.

18. The apparatus of claim 16, wherein the one or more processors, being configured to detect the triggering event, are further configured to detect that at least one of a reference signal received power (RSRP) or a channel quality indicator (CQI) is below a threshold.

19. The apparatus of claim 16, wherein the indication comprises an uplink grant and the CSI report comprises a medium access control-control element (MAC-CE).

20. The apparatus of claim 16, wherein the CSI report comprises an indication of a recommended beam.

21. The apparatus of claim 16, wherein the triggering event is detected based on the signal measurement.

22. The apparatus of claim 16, wherein the one or more processors, being configured to transmit the uplink transmission, are further configured to transmit, to the base station, on a plurality of uplink transmission configuration indicator (TCI) beams via a physical uplink control channel (PUCCH), the CSI report, and wherein a first uplink TCI beam of the plurality of uplink TCI beams corresponds to the beam from which the signal is received.

23. The apparatus of claim 22, wherein the CSI report comprises information of each of the plurality of uplink TCI beams, wherein the information indicates the first uplink TCI beam is associated with the beam failure.

24. The apparatus of claim 22, wherein the one or more processors are further configured to receive, from the base station via the transceiver, instructions for the UE to change at least one of the plurality of uplink TCI beams based on the uplink transmission from the UE.

25. The apparatus of claim 16, wherein the uplink request is mapped to the SR, wherein the SR is transmitted using multiple PUCCH resource identifiers.

26. The apparatus of claim 16, wherein the SR is a first SR, wherein the uplink request is mapped to multiple SRs including the first SR, and wherein each of the multiple SRs uses a same PUCCH resource identifier.

27. A method of wireless communication performed by a base station, the method comprising:

receiving an uplink request from a user equipment (UE) for providing channel state information (CSI) for a beam, wherein the uplink request is received via a scheduling request (SR) for which selection of a physical uplink control channel (PUCCH) resource on which the SR is received indicates that the beam is associated with an occurrence of a triggering event, wherein the triggering event comprises a beam failure;

transmitting an indication scheduling a CSI report in response to the uplink request; and receiving an uplink transmission from the UE comprising the CSI report for the beam wherein the CSI report is received according to the indication.

28. The method of claim 27, wherein the indication comprises an uplink grant and the CSI report comprises a medium access control-control element (MAC-CE).

29. An apparatus for wireless communication at a base station, the apparatus comprising:

a transceiver;

one or more memories, individually or in combination, having instructions; and one or more processors, individually or in combination, configured to execute the instructions and cause the apparatus to:

receive, via the transceiver, an uplink request from a user equipment (UE) for providing channel state information (CSI) for a beam, wherein the uplink request is received via a scheduling request (SR) for which selection of a physical uplink control channel (PUCCH) resource on which the SR is received indicates that the beam is associated with an occurrence of a triggering event, wherein the triggering event comprises a beam failure;

transmitting, via the transceiver, an indication scheduling a CSI report in response to the uplink request; and receiving, via the transceiver, an uplink transmission from the UE comprising the CSI report for the beam wherein the CSI report is received according to the indication.

30. The apparatus of claim 29, wherein the indication comprises an uplink grant and the CSI report comprises a medium access control-control element (MAC-CE).

* * * * *